(12) United States Patent
Pace et al.

(10) Patent No.: US 7,457,472 B2
(45) Date of Patent: Nov. 25, 2008

(54) APPARATUS AND METHOD FOR PROCESSING VIDEO DATA

(75) Inventors: Charles P. Pace, North Chittenden, VT (US); John Edward Weiss, Arlington, MA (US)

(73) Assignee: Euclid Discoveries, LLC, Concord, MA (US)

(*) Notice: Subject to any disclaimer, the term of this patent is extended or adjusted under 35 U.S.C. 154(b) by 255 days.

(21) Appl. No.: 11/396,010

(22) Filed: Mar. 31, 2006

(65) Prior Publication Data

US 2006/0233448 A1 Oct. 19, 2006

Related U.S. Application Data

(63) Continuation-in-part of application No. 11/336,366, filed on Jan. 20, 2006, which is a continuation-in-part of application No. 11/280,625, filed on Nov. 16, 2005, which is a continuation-in-part of application No. 11/230,686, filed on Sep. 20, 2005, which is a continuation-in-part of application No. 11/191,562, filed on Jul. 28, 2005, now Pat. No. 7,158,680.

(60) Provisional application No. 60/670,951, filed on Apr. 13, 2005, provisional application No. 60/667,532, filed on Mar. 31, 2005.

(51) Int. Cl.
*G06K 9/36* (2006.01)
*G06K 9/00* (2006.01)

(52) U.S. Cl. .................. 382/236; 382/103

(58) Field of Classification Search ......... 382/115–118, 382/154, 100, 103, 107, 232–233, 162–166, 382/236, 173, 209, 224–225, 243; 345/418–428, 345/581–589, 473–475, 441, 530; 348/14.1–14.16, 348/77–78, 699; 375/240.08, 240.16; 715/700
See application file for complete search history.

(56) References Cited

U.S. PATENT DOCUMENTS 5,774,591 A * 6/1998 Black et al. .................. 382/236

(Continued)

FOREIGN PATENT DOCUMENTS

WO WO 00/45600 8/2000

OTHER PUBLICATIONS

Rehg, J. M. and Witkin, A. P., "Visual Tracking with Deformation Models," *Proc. IEEE Int'l. Conf. on Robotics and Automation*, pp. 844-850 (Apr. 1991).

(Continued)

*Primary Examiner*—Sherali Ishrat
(74) *Attorney, Agent, or Firm*—Hamilton, Brook, Smith & Reynolds, P.C.

(57) ABSTRACT

An apparatus and methods for processing video data are described. The invention provides a representation of video data that can be used to assess agreement between the data and a fitting model for a particular parameterization of the data. This allows the comparison of different parameterization techniques and the selection of the optimum one for continued video processing of the particular data. The representation can be utilized in intermediate form as part of a larger process or as a feedback mechanism for processing video data. When utilized in its intermediate form, the invention can be used in processes for storage, enhancement, refinement, feature extraction, compression, coding, and transmission of video data. The invention serves to extract salient information in a robust and efficient manner while addressing the problems typically associated with video data sources.

10 Claims, 14 Drawing Sheets

U.S. PATENT DOCUMENTS

| | | | |
|---|---|---|---|
| 5,774,595 | A | 6/1998 | Kim |
| 6,546,117 | B1 | 4/2003 | Sun et al. |
| 6,574,353 | B1 | 6/2003 | Schoepflin |
| 6,611,628 | B1 | 8/2003 | Sekiguchi et al. |
| 6,625,310 | B2 | 9/2003 | Lipton et al. |
| 6,661,004 | B2 | 12/2003 | Aumond et al. |
| 6,711,278 | B1 | 3/2004 | Gu et al. |
| 6,731,799 | B1 | 5/2004 | Sun et al. |
| 6,738,424 | B1 | 5/2004 | Allmen et al. |
| 6,751,354 | B2 | 6/2004 | Foote et al. |
| 6,774,917 | B1 | 8/2004 | Foote et al. |
| 6,925,122 | B2 | 8/2005 | Gorodnichy |
| 7,158,680 | B2 | 1/2007 | Pace |
| 7,164,718 | B2 | 1/2007 | Maziere et al. |
| 2003/0011589 | A1 | 1/2003 | Desbrun et al. |
| 2003/0103647 | A1 | 6/2003 | Rui et al. |
| 2003/0194134 | A1 | 10/2003 | Wenzel et al. |
| 2003/0235341 | A1 | 12/2003 | Gokturk et al. |
| 2004/0013286 | A1 | 1/2004 | Viola et al. |
| 2004/0107079 | A1 | 6/2004 | MacAuslan |
| 2004/0135788 | A1 | 7/2004 | Davidson et al. |
| 2006/0067585 | A1 | 3/2006 | Pace |
| 2006/0133681 | A1 | 6/2006 | Pace |
| 2006/0177140 | A1 | 8/2006 | Pace |
| 2007/0071336 | A1 | 3/2007 | Pace |

OTHER PUBLICATIONS

Gunsel, B. et al., "Content-based access to video objects: Temporal segmentation, visual summarization, and feature extraction," *Signal Processing*, vol. 66, pp. 261-280 (1998).

Piamsa-nga, P. and N. Babaguchi, "Motion estimation and detection of complex object by analyzing resampled movements of parts," in *Proc. ICIP '04*, 1 (365-368), Oct. 2004.

Vidal, R. et al., "Generalized principal component analysis (GPCA)", in *Proc. CVPR '03*, 1 (1621-628), Jun. 2003.

Vidal, R. and R. Hartley, "Motion segmentation with missing data using PowerFactorization and GPCA," in *Proc. CVPR 04*, 2 (II-310-316), Jun.-Jul. 2004.

Huang, R. et al., "Sparse representation of images with hybrid linear models," in *Proc. ICIP '04*, 2(1281-1284) Oct. 2004.

Rong, S. et al., "Efficient spatiotemporal segmentation and video object generation for highway surveillance video," in *Proc. IEEE Int'l, Conf. Communications, Circuits and Systems and West Sino Expositions*, 1(580-584), Jun.-Jul. 2002.

Toklu, C. et al., "Simultaneous Alpha Map Generation and 2-D Mesh Tracking for Multimedia Applications," *Proceedings of the International Conference on Image Processing*: 1997, (113-116) (Oct. 1997).

Urban, M., "Harris Interest Operator," Jan. 28, 2003, http://cmp.felk.cvut.cz/cmp/courses/dzo/resources/lecture_harris_urban.pdf (23 pp.).

Jones, M. and P. Viola, "Fast Multi-View Face Detection," Mitsubishi Electrical Laboratories, Jul. 2003 (10 pp.).

Viola, P. and M. Jones, "Rapid Object Detection using a Boosted Cascade of Simple Features," *Proceedings of the 2001 IEEE Computer Society Conference on Computer Vision and Pattern Recognition*, 2001, vol. 1, pp. 511-518.

Kass, Michael, Andrew Witzin, and Demetri Terzopoulos, "Snakes: Active contour Models," *International Journal of Computer Vision* (1988).

\* cited by examiner

Global Motion Model Estimation

Concensus Rank Acceptance Test and Processing

FIG. 6  Hybrid

Local Normalization - Mesh Generation

FIG. 8 — Local Normalization - Mesh Based Normalization

FIG. 9  Combined Global & Local Normalization

FIG. 10     GPCA – Basic Polynomial Fitting & Differentiation

FIG. 11  GPCA – Recursive GPCA Refinement

Object Interpolation

APPARATUS AND METHOD FOR PROCESSING VIDEO DATA

This application claims the priority of U.S. Provisional Application No. 60/667,532, titled "System And Method For Video Compression Employing Principal Component Analysis," filed Mar. 31, 2005 and U.S. Provisional Application No. 60/670,951, titled "Apparatus and Methods for Processing Video Data," filed Apr. 13, 2005. This application is a continuation-in-part of U.S. application Ser. No. 11/336,366 filed Jan. 20, 2006, which is a continuation-in-part of U.S. application Ser. No. 11/280,625 filed Nov. 16, 2005, which is a continuation-in-part of U.S. application Ser. No. 11/230,686, filed Sep. 20, 2005, which is a continuation-in-part of U.S. application Ser. No. 11/191,562, filed Jul. 28, 2005 now U.S. Pat. No. 7,158,680. Each of the foregoing applications is incorporated herein by reference in its entirety.

FIELD OF THE INVENTION

The present invention is generally related to the field of digital signal processing, and more particularly, to computer apparatus and computer-implemented methods for the efficient representation and processing of signal or image data, and most particularly, video data.

DESCRIPTION OF THE PRIOR ART

The general system description of the prior art in which the current invention resides can be expressed as in FIG. 1. Here a block diagram displays the typical prior art video processing system. Such systems typically include the following stages: an input stage 102, a processing stage 104, an output stage 106, and one or more data storage mechanism(s) 108.

The input stage 102 may include elements such as camera sensors, camera sensor arrays, range finding sensors, or a means of retrieving data from a storage mechanism. The input stage provides video data representing time correlated sequences of man-made and/or naturally occurring phenomena. The salient component of the data may be masked or contaminated by noise or other unwanted signals.

The video data, in the form of a data stream, array, or packet, may be presented to the processing stage 104 directly or through an intermediate storage element 108 in accordance with a predefined transfer protocol. The processing stage 104 may take the form of dedicated analog or digital devices, or programmable devices such as central processing units (CPUs), digital signal processors (DSPs), or field programmable gate arrays (FPGAs) to execute a desired set of video data processing operations. The processing stage 104 typically includes one or more CODECs (COder/DECcoders).

Output stage 106 produces a signal, display, or other response which is capable of affecting a user or external apparatus. Typically, an output device is employed to generate an indicator signal, a display, a hardcopy, a representation of processed data in storage, or to initiate transmission of data to a remote site. It may also be employed to provide an intermediate signal or control parameter for use in subsequent processing operations.

Storage is presented as an optional element in this system. When employed, storage element 108 may be either non-volatile, such as read-only storage media, or volatile, such as dynamic random access memory (RAM). It is not uncommon for a single video processing system to include several types of storage elements, with the elements having various relationships to the input, processing, and output stages. Examples of such storage elements include input buffers, output buffers, and processing caches.

The primary objective of the video processing system in FIG. 1 is to process input data to produce an output which is meaningful for a specific application. In order to accomplish this goal, a variety of processing operations may be utilized, including noise reduction or cancellation, feature extraction, object segmentation and/or normalization, data categorization, event detection, editing, data selection, data re-coding, and transcoding.

Many data sources that produce poorly constrained data are of importance to people, especially sound and visual images. In most cases the essential characteristics of these source signals adversely impact the goal of efficient data processing. The intrinsic variability of the source data is an obstacle to processing the data in a reliable and efficient manner without introducing errors arising from naïve empirical and heuristic methods used in deriving engineering assumptions. This variability is lessened for applications when the input data are naturally or deliberately constrained into narrowly defined characteristic sets (such as a limited set of symbol values or a narrow bandwidth). These constraints all too often result in processing techniques that are of low commercial value.

The design of a signal processing system is influenced by the intended use of the system and the expected characteristics of the source signal used as an input. In most cases, the performance efficiency required will also be a significant design factor. Performance efficiency, in turn, is affected by the amount of data to be processed compared with the data storage available as well as the computational complexity of the application compared with the computing power available.

Conventional video processing methods suffer from a number of inefficiencies which are manifested in the form of slow data communication speeds, large storage requirements, and disturbing perceptual artifacts. These can be serious problems because of the variety of ways people desire to use and manipulate video data and because of the innate sensitivity people have for some forms of visual information.

An "optimal" video processing system is efficient, reliable, and robust in performing a desired set of processing operations. Such operations may include the storage, transmission, display, compression, editing, encryption, enhancement, categorization, feature detection, and recognition of the data. Secondary operations may include integration of such processed data with other information sources. Equally important, in the case of a video processing system, the outputs should be compatible with human vision by avoiding the introduction of perceptual artifacts.

A video processing system may be described as "robust" if its speed, efficiency, and quality do not depend strongly on the specifics of any particular characteristics of the input data. Robustness also is related to the ability to perform operations when some of the input is erroneous. Many video processing systems fail to be robust enough to allow for general classes of applications—providing only application to the same narrowly constrained data that was used in the development of the system.

Salient information can be lost in the discretization of a continuous-valued data source due to the sampling rate of the input element not matching the signal characteristics of the sensed phenomena. Also, there is loss when the signal's strength exceeds the sensor's limits, resulting in saturation. Similarly, information is lost when the precision of input data is reduced as happens in any quantization process when the full range of values in the input data is represented by a set of discrete values, thereby reducing the precision of the data representation.

Ensemble variability refers to any unpredictability in a class of data or information sources. Data representative of visual information has a very large degree of ensemble variability because visual information is typically unconstrained. Visual data may represent any spatial array sequence or spatio-temporal sequence that can be formed by light incident on a sensor array.

In modeling visual phenomena, video processors generally impose some set of constraints and/or structure on the manner in which the data is represented or interpreted. As a result, such methods can introduce systematic errors which would impact the quality of the output, the confidence with which the output may be regarded, and the type of subsequent processing tasks that can reliably be performed on the data.

Quantization methods reduce the precision of data in the video frames while attempting to retain the statistical variation of that data. Typically, the video data is analyzed such that the distributions of data values are collected into probability distributions. There are also methods that project the data into phase space in order to characterize the data as a mixture of spatial frequencies, thereby allowing precision reduction to be diffused in a less objectionable manner. When utilized heavily, these quantization methods often result in perceptually implausible colors and can induce abrupt pixilation in originally smooth areas of the video frame.

Differential coding is also typically used to capitalize on the local spatial similarity of data. Data in one part of the frame tend to be clustered around similar data in that frame, and also in a similar position in subsequent frames. Representing the data in terms of its spatially adjacent data can then be combined with quantization and the net result is that, for a given precision, representing the differences is more accurate than using the absolute values of the data. This assumption works well when the spectral resolution of the original video data is limited, such as in black and white video, or low-color video. As the spectral resolution of the video increases, the assumption of similarity breaks down significantly. The breakdown is due to the inability to selectively preserve the precision of the video data.

Residual coding is similar to differential encoding in that the error of the representation is further differentially encoded in order to restore the precision of the original data to a desired level of accuracy.

Variations of these methods attempt to transform the video data into alternate representations that expose data correlations in spatial phase and scale. Once the video data has been transformed in these ways, quantization and differential coding methods can then be applied to the transformed data resulting in an increase in the preservation of the salient image features. Two of the most prevalent of these transform video compression techniques are the discrete cosine transform (DCT) and discrete wavelet transform (DWT). Error in the DCT transform manifests in a wide variation of video data values, and therefore, the DCT is typically used on blocks of video data in order to localize these false correlations. The artifacts from this localization often appear along the border of the blocks. For the DWT, more complex artifacts happen when there is a mismatch between the basis function and certain textures, and this causes a blurring effect. To counteract the negative effects of DCT and DWT, the precision of the representation is increased to lower distortion at the cost of precious bandwidth.

SUMMARY OF THE INVENTION

The present invention is a computer-implemented video processing method that provides both computational and analytical advantages over existing state-of-the-art methods. The principle inventive method is the integration of a linear decompositional method, a spatial segmentation method, and a spatial normalization method. Spatially constraining video data greatly increases the robustness and applicability of linear decompositional methods. Additionally, spatial segmentation of the data corresponding to the spatial normalization, can further serve to increase the benefits derived from spatial normalization alone.

In particular, the present invention provides a means by which signal data can be efficiently processed into one or more beneficial representations. The present invention is efficient at processing many commonly occurring data sets and is particularly efficient at processing video and image data. The inventive method analyzes the data and provides one or more concise representations of that data to facilitate its processing and encoding. Each new, more concise data representation allows reduction in computational processing, transmission bandwidth, and storage requirements for many applications, including, but not limited to: encoding, compression, transmission, analysis, storage, and display of the video data. The invention includes methods for identification and extraction of salient components of the video data, allowing a prioritization in the processing and representation of the data. Noise and other unwanted parts of the signal are identified as lower priority so that further processing can be focused on analyzing and representing the higher priority parts of the video signal. As a result, the video signal is represented more concisely than was previously possible. And the loss in accuracy is concentrated in the parts of the video signal that are perceptually unimportant.

DETAILED DESCRIPTION

In video signal data, frames of video are assembled into a sequence of images usually depicting a three dimensional scene as projected, imaged, onto a two dimensional imaging surface. Each frame, or image, is composed of picture elements (pels) that represent an imaging sensor response to the sampled signal. Often, the sampled signal corresponds to some reflected, refracted, or emitted energy, (e.g. electromagnetic, acoustic, etc) sampled by a two dimensional sensor array. A successive sequential sampling results in a spatiotemporal data stream with two spatial dimensions per frame and a temporal dimension corresponding to the frame's order in the video sequence.

Figure 1:
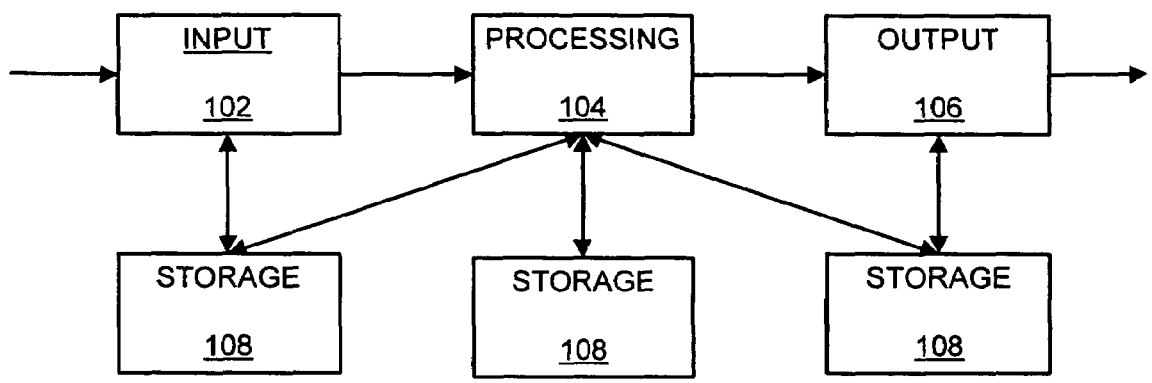
FIG. 1 is a block diagram illustrating a prior art video processing system.
Figure 2:
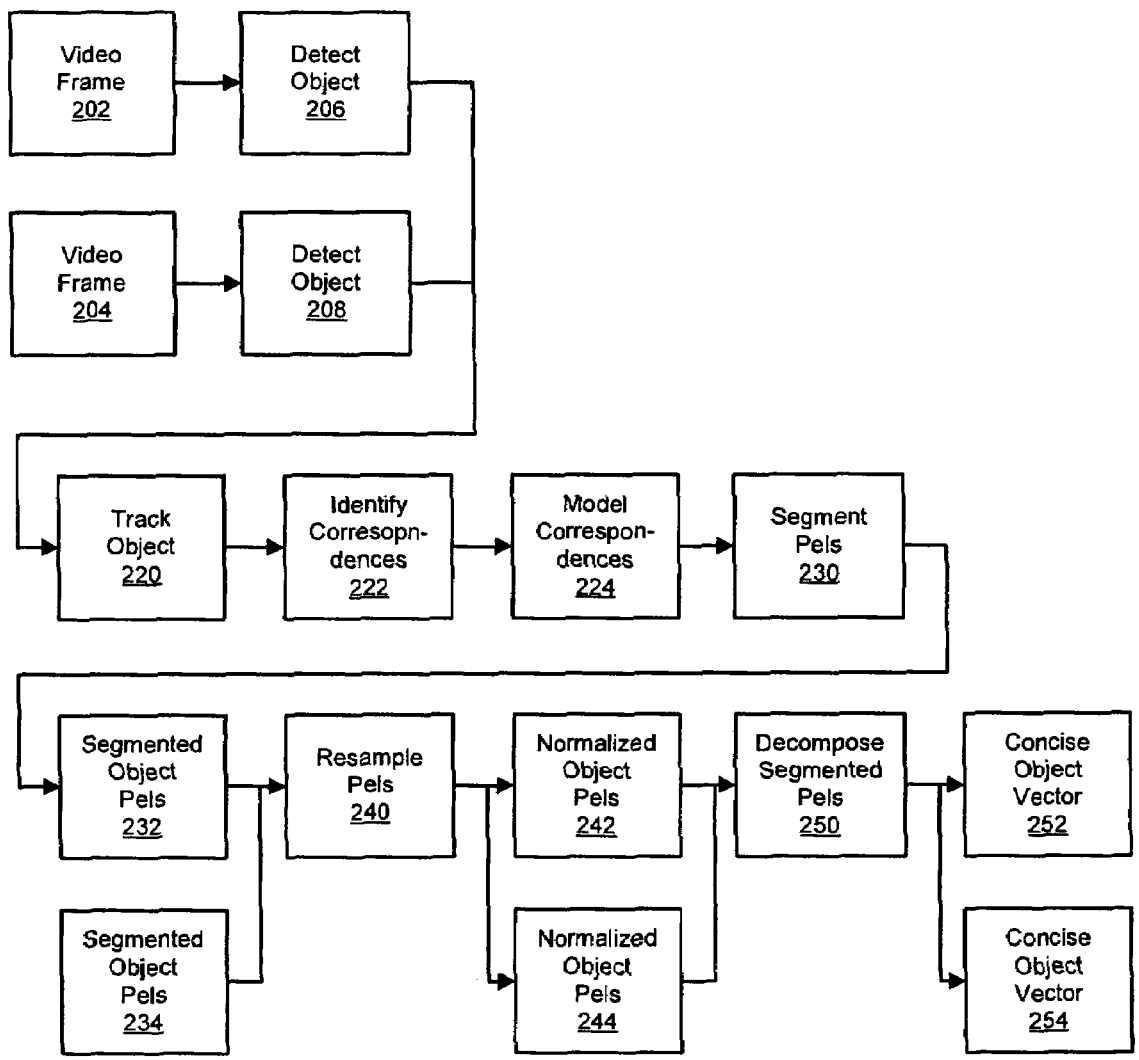
FIG. 2 is a block diagram providing an overview of the invention that shows the major modules for processing video.

The present invention as illustrated in FIG. 2 analyzes signal data and identifies the salient components. When the signal is comprised of video data, analysis of the spatiotemporal stream reveals salient components that are often specific objects, such as faces. The identification process qualifies the existence and significance of the salient components, and chooses one or more of the most significant of those qualified salient components. This does not limit the identification and processing of other less salient components after or concurrently with the presently described processing. The aforementioned salient components are then further analyzed, identifying the variant and invariant subcomponents. The identification of invariant subcomponents is the process of modeling some aspect of the component, thereby revealing a parameterization of the model that allows the component to be synthesized to a desired level of accuracy.

In one embodiment of the invention, a foreground object is detected and tracked. The object's pels are identified and segmented from each frame of the video. The block-based motion estimation is applied to the segmented object in multiple frames. These motion estimates are then integrated into a higher order motion model. The motion model is employed to warp instances of the object to a common spatial configuration. For certain data, in this configuration, more of the features of the object are aligned. This normalization allows the linear decomposition of the values of the object's pels over multiple frames to be compactly represented. The salient information pertaining to the appearance of the object is contained in this compact representation.

A preferred embodiment of the present invention details the linear decomposition of a foreground video object. The object is normalized spatially, thereby yielding a compact linear appearance model. A further preferred embodiment additionally segments the foreground object from the background of the video frame prior to spatial normalization.

A preferred embodiment of the invention applies the present invention to a video of a person speaking into a camera while undergoing a small amount of motion.

A preferred embodiment of the invention applies the present invention to any object in a video that can be represented well through spatial transformations.

A preferred embodiment of the invention specifically employs block-based motion estimation to determine finite differences between two or more frames of video. A higher order motion model is factored from the finite differences in order to provide a more effective linear decomposition.

Detection & Tracking

It is known in the art to detect an object in a frame and to track that object through a predetermined number of later frames. Among the algorithms and programs that can be used to perform the object detection function is the Viola/Jones: P. Viola and M. Jones, "Robust Real-time Object Detection," in Proc. 2nd Int'l Workshop on Statistical and Computational Theories of Vision—Modeling, Learning, Computing and Sampling, Vancouver, Canada, Jul. 2001. Likewise, there are a number of algorithms and programs that can be used to track the detected object through successive frames. An example includes: C. Edwards, C. Taylor, and T. Cootes. "Learning to identify and track faces in an image sequence." Proc. Int'l Conf. Auto. Face and Gesture Recognition, pages 260-265, 1998.

The result of the object detection process is a data set that specifies the general position of the center of the object in the frame and an indication as to the scale (size) of the object. The result of the tracking process is a data set that represents a temporal label for the object and assures that to a certain level of probability the object detected in the successive frames is the same object.

The object detection and tracking algorithm may be applied to a single object in the frames or to two or more objects in the frames.

It is also known to track one or more features of the detected object in the group of sequential frames. If the object is a human face, for example, the features could be an eye or a nose. In one technique, a feature is represented by the intersection of "lines" that can loosely be described as a "corner." Preferably, "corners" that are both strong and spatially disparate from each other are selected as features. The features may be identified through a spatial intensity field gradient analysis. Employing a hierarchical multi-resolution estimation of the optical flow allows the determination of the translational displacement of the features in successive frames. M. J. Black and Y. Yacoob. "Tracking and recognizing rigid and non-rigid facial motions using local parametric models of image motions." In Proceedings of the International Conference on Computer Vision, pages 374-381, Boston, Mass. Jun. 1995 is an example of an algorithm that uses this technique to track features.

Once the constituent salient components of the signal have been determined, these components may be retained, and all other signal components may be diminished or removed. The process of detecting the salient component is shown in FIG. 2, where the Video Frame (202) is processed by one or more Detect Object (206) processes, resulting in one or more objects being identified, and subsequently tracked. The retained components represent the intermediate form of the video data. This intermediate data can then be encoded using techniques that are typically not available to existing video processing methods. As the intermediate data exists in several forms, standard video encoding techniques can also be used to encode several of these intermediate forms. For each instance, the present invention determines and then employs the encoding technique that is most efficient.

In one preferred embodiment, a saliency analysis process detects and classifies salient signal modes. One embodiment of this process employs a combination of spatial filters specifically designed to generate a response signal whose strength is relative to the detected saliency of an object in the video frame. The classifier is applied at differing spatial scales and in different positions of the video frame. The strength of the response from the classifier indicates the likelihood of the presence of a salient signal mode. When centered over a strongly salient object, the process classifies it with a correspondingly strong response. The detection of the salient signal mode distinguishes the present invention by enabling the subsequent processing and analysis on the salient information in the video sequence.

Given the detection location of a salient signal mode in one or more frames of video, the present invention analyzes the salient signal mode's invariant features. Additionally, the invention analyzes the residual of the signal, the "less-salient" signal modes, for invariant features. Identification of invariant features provides a basis for reducing redundant information and segmenting (i.e. separating) signal modes.

Feature Point Tracking

In one embodiment of the present invention, spatial positions in one or more frames are determined through spatial intensity field gradient analysis. These features correspond to some intersection of "lines" which can be described loosely as a "corner". Such an embodiment further selects a set of such corners that are both strong corners and spatially disparate from each other, herein referred to as the feature points. Further, employing a hierarchical multi-resolution estimation of the optical flow allows the determination of the translational displacement of the feature points over time.

In FIG. 2, the Track Object (220) process is shown to pull together the detection instances from the Detect Object processes (208) and further Identify Correspondences (222) of features of one or more of the detected objects over a multitude of Video Frames (202 & 204).

A non-limiting embodiment of feature tracking can be employed such that the features are used to qualify a more regular gradient analysis method such as block-based motion estimation.

Another embodiment anticipates the prediction of motion estimates based on feature tracking.

Object-Based Detection and Tracking

In one non-limiting embodiment of the current invention, a robust object classifier is employed to track faces in frames of video. Such a classifier is based on a cascaded response to oriented edges that has been trained on faces. In this classifier, the edges are defined as a set of basic Haar features and the rotation of those features by 45 degrees. The cascaded classifier is a variant of the AdaBoost algorithm. Additionally, response calculations can be optimized through the use of summed area tables.

Local Registration

Registration involves the assignment of correspondences between elements of identified objects in two or more video frames. These correspondences become the basis for modeling the spatial relationships between video data at temporally distinct points in the video data.

Various non-limiting means of registration are described for the present invention in order to illustrate specific embodiments and their associated reductions to practice in terms of well known algorithms and inventive derivatives of those algorithms.

One means of modeling the apparent optical flow in a spatio-temporal sequence can be achieved through generation of a finite difference field from two or more frames of the video data. Optical flow field can be sparsely estimated if the correspondences conform to certain constancy constraints in both a spatial and an intensity sense.

Figure 3:
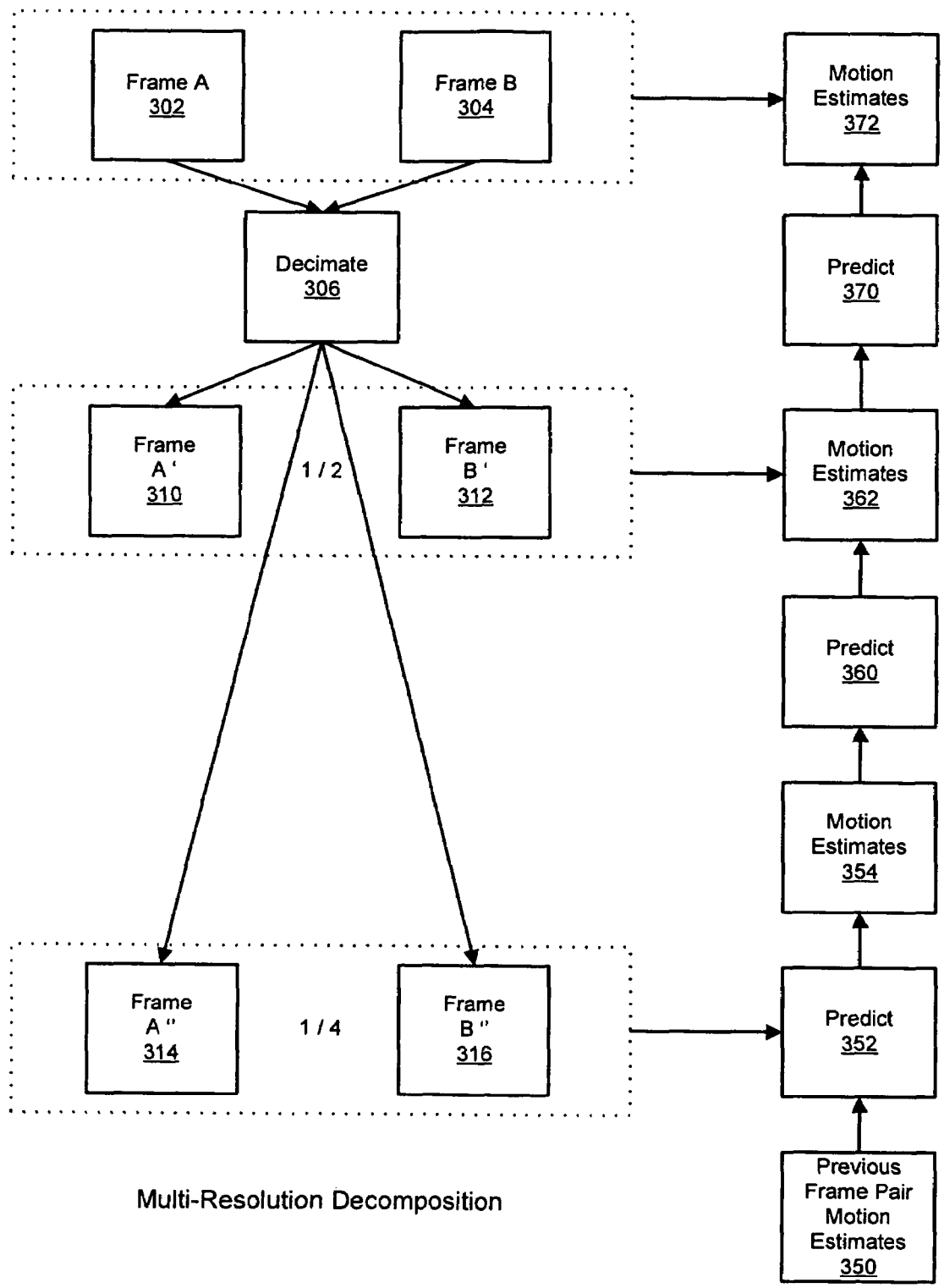
FIG. 3 is a block diagram illustrating the motion estimation method of the invention.

As shown in FIG. 3, a Frame (302 or 304) is sub-sampled spatially, possibly through a decimation process (306), or some other sub-sampling process (e.g. low pass filter). These spatially reduced images (310 & 312) can be further sub-sampled as well.

Diamond Search

Given a non-overlapping partitioning of a frame of video into blocks, search the previous frame of video for a match to each block. The full search block-based (FSBB) motion estimation finds the position in the previous frame of video that has the lowest error when compared with a block in the current frame. Performing FSBB can be quite expensive computationally, and often does not yield a better match than other motion estimation schemes based on the assumption of localized motion. Diamond search block-based (DSBB) gradient descent motion estimation is a common alternative to FSBB that uses a diamond shaped search pattern of various sizes to iteratively traverse an error gradient toward the best match for a block.

In one embodiment of the present invention, DSBB is employed in the analysis of the image gradient field between one or more frames of video in order to generate finite differences whose values are later factored into higher order motion models.

One skilled in the art is aware that block-based motion estimation can be seen as the equivalent of an analysis of vertices of a regular mesh.

Mesh-Based Motion Estimation

Mesh based prediction uses a geometric mesh of vertices connected by edges to delineate discrete regions of the video frame and then subsequently predict the deformation and movement of those regions in subsequent frames through deformation models controlled by the position of the mesh vertices. As the vertices are moved, the pels within the regions defined by the vertices are moved as well to predict the current frame. The relative movement and resulting approximation of the original pel values are performed through some interpolation method that associates the pel position with that of the vertices in the vicinity of that pel. The additional modeling of scaling and rotation as compared to pure translation can produce a more accurate prediction of the frame's pels when such motions are present in the video signal.

Generally, mesh models can be defined as being regular or adaptive. Regular mesh models are laid out without considering the underlying signal characteristics while adaptive methods attempt to spatial arrange vertices and edges relative to features of the underlying video signal.

Regular mesh representations provide a means by which the motion, or equivalently the deformations inherent in the motion, can be predicted or modeled, provided the imaged objects in the video have spatial discontinuities that more correspond to edges in the mesh.

Adaptive meshes are formed with substantially greater consideration for the features of the underlying video signal than regular meshes. Additionally, the adaptive nature of such a mesh may allow for various refinements of the mesh over time.

The present invention adjusts the vertex search order using homogeneity criteria in order to perform mesh, and equivalently pel, registration. Vertices that are associated spatially with heterogeneous intensity gradients are motion estimated before those having a more homogenous gradient.

In a preferred embodiment, the vertex motion estimation of the mesh is additionally prioritized through a spatial flood-filling of motion estimation for vertices of equivalent or near equivalent homogeneity.

In a preferred embodiment, the original mesh spatial configuration and final mesh configuration are mapped to each other on a facet level by filling a mapping image with facet identifiers using standard graphical filling routines. The affine transformations associated with each triangle can be quickly looked up in a transform table and pel positions associated with a facet in one mesh can quickly be transformed into a position in the other mesh.

In a preferred embodiment, a preliminary motion estimation is made for vertices in order to assess the residual error associated with each motion estimation match. This preliminary estimation is additionally used to prioritize the motion estimation order of the vertices. The advantage of such a residual error analysis is that motion estimates that are associated with less distortion will result in maintaining a more plausible mesh topology.

In a preferred embodiment, mesh vertex motion estimates are scaled down to some limited range and multiple motion estimations are made through several iterations in order to allow the mesh to approach a more globally optimal and topologically correct solution.

In a preferred embodiment, block-based motion estimates utilizing a rectangular tile neighborhood centered on each vertex is used to determine the vertex displacement in deference to an interpolated polygon neighborhood. In addition to avoiding a spatial interpolation and warping of pels for error gradient descent, this technique also allows parallel computation of motion estimates.

Phase-Based Motion Estimation

In the prior art, block-based motion estimation typically implemented as a spatial search resulting in one or more spatial matches. Phase-based normalized cross correlation (PNCC) as illustrated in FIG. 3 transforms a block from the current frame and the previous frame into "phase space" and finds the cross correlation of those two blocks. The cross correlation is represented as a field of values whose positions correspond to the 'phase shifts' of edges between the two blocks. These positions are isolated through thresholding and then transformed back into spatial coordinates. The spatial coordinates are distinct edge displacements, and correspond to motion vectors.

Advantages of the PNCC include contrast masking which allows the tolerance of gain/exposure adjustment in the video stream. Also, the PNCC allows results from a single step that might take many iterations from a spatially based motion estimator. Further, the motion estimates are sub-pixel accurate.

One embodiment of the invention utilizes PNCC in the analysis of the image gradient field between one or more frames of video in order to generate finite differences whose values are later factored into higher order motion models.

Global Registration

In one embodiment, the present invention generates a correspondence model by using the relationships between corresponding elements of a detected object in two or more frames of video. These relationships are analyzed by factoring one or more linear models from a field of finite difference estimations. The term field refers to each finite difference having a spatial position. These finite differences may be the translational displacements of corresponding object features in disparate frames of video described in the Detection & Tracking section. The field from which such sampling occurs is referred to herein as the general population of finite differences. The described method employs robust estimation similar to that of the RANSAC algorithm as described in: M. A. Fischler, R. C. Bolles. "Random Sample Consensus: A Paradigm for Model Fitting with Applications to Image Analysis and Automated Cartography." Comm. of the ACM, Vol 24, pp 381-395, 1981.

Figure 4:
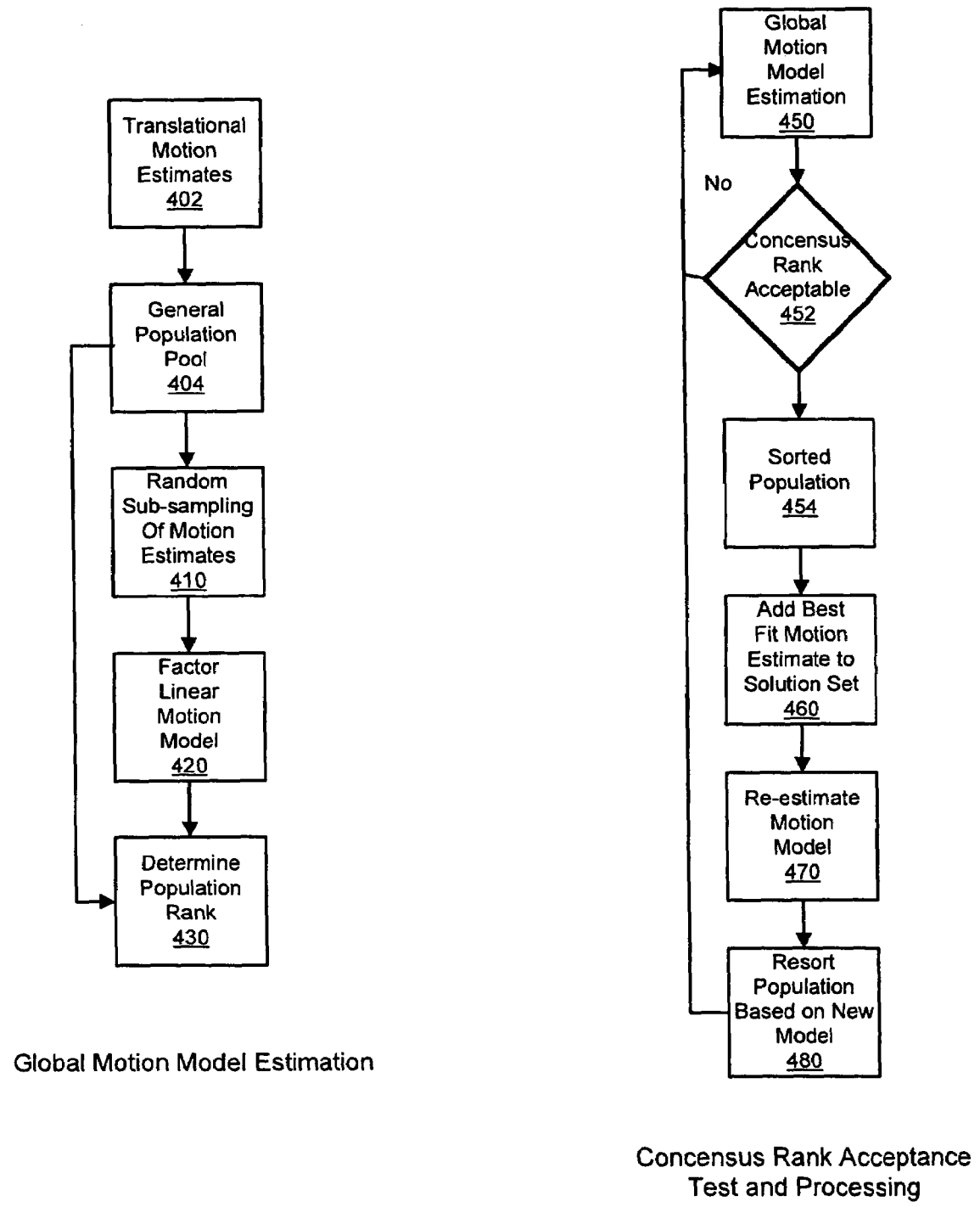
FIG. 4 is a block diagram illustrating the global registration method of the invention.

As shown in FIG. 4, the finite differences, in the case of global motion modeling, are Translational Motion Estimates (402) that are collected into a General Population Pool (404) which is iteratively processed by a Random Sampling of those Motion Estimates (410) and a linear model is factored out (420) of those samples. The Results are then used to adjust the population (404) to better clarify the linear model through the exclusion of outliers to the model, as found through the random process.

The present invention is able to utilize one or more robust estimators; one of which may be the RANSAC robust estimation process. Robust estimators are well documented in the prior art.

In one embodiment of the linear model estimation algorithm, the motion model estimator is based on a linear least squares solution. This dependency causes the estimator to be thrown off by outlier data. Based on RANSAC, the disclosed method is a robust method of countering the effect of outliers through the iterative estimation of subsets of the data, probing for a motion model that will describe a significant subset of the data. The model generated by each probe is tested for the percentage of the data that it represents. If there are a sufficient number of iterations, then a model will be found that fits the largest subset of the data. A description of how to perform such robust linear least squares regression is described in: R. Dutter and P. J. Huber. "Numerical methods for the nonlinear robust regression problem." Journal of Statistical and Computational Simulation, 13:79-113, 1981.

As conceived and illustrated in FIG. 4, the present invention discloses innovations beyond the RANSAC algorithm in the form of alterations of the algorithm that involve the initial sampling of finite differences (samples) and least squares estimation of a linear model. Synthesis error is assessed for all samples in the general population using the solved linear model. A rank is assigned to the linear model based on the number of samples whose residual conforms to a preset threshold. This rank is considered the "candidate consensus".

The initial sampling, solving, and ranking are performed iteratively until termination criteria are satisfied. Once the criteria are satisfied, the linear model with the greatest rank is considered to be the final consensus of the population.

An option refinement step involves iteratively analyzing subsets of samples in the order of best fit to the candidate model, and increasing the subset size until adding one more sample would exceed a residual error threshold for the whole subset.

As shown in FIG. 4, The Global Model Estimation process (450) is iterated until the Consensus Rank Acceptability test is satisfied (452). When the rank has not been achieved, the population of finite differences (404) is sorted relative to the discovered model in an effort to reveal the linear model. The best (highest rank) motion model is added to a solution set in process 460. Then the model is re-estimated in process 470. Upon completion, the population (404) is re-sorted.

The described non-limiting embodiments of the invention can be further generalized as a general method of sampling a vector space, described above as a field of finite difference vectors, in order to determine subspace manifolds in another parameter vector space that would correspond to a particular linear model.

A further result of the global registration process is that the difference between this and the local registration process yields a local registration residual. This residual is the error of the global model in approximating the local model.

Normalization

Figure 5:
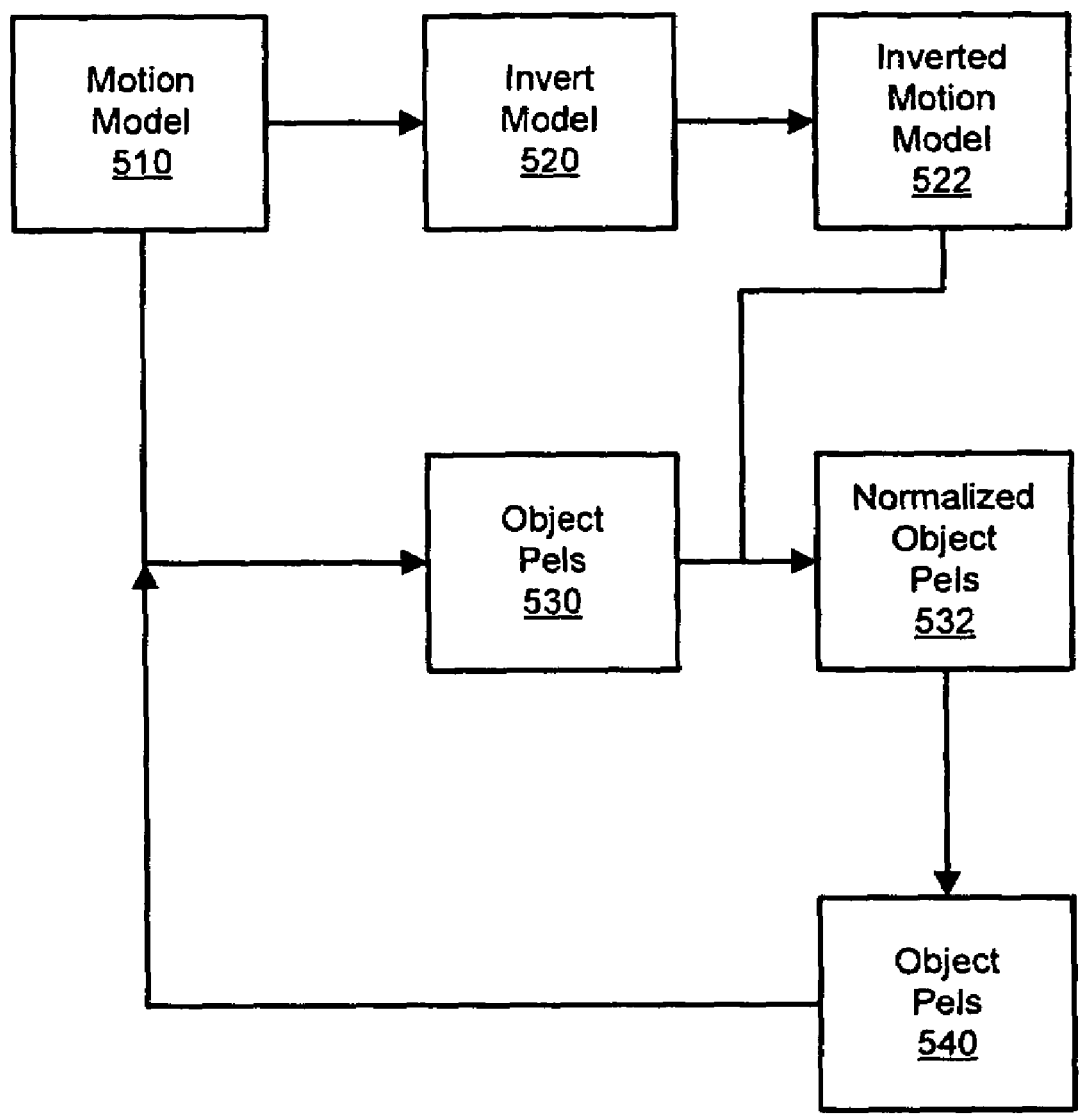
FIG. 5 is a block diagram illustrating the normalization method of the invention.

Normalization refers to the resampling of spatial intensity fields towards a standard, or common, spatial configuration. When these relative spatial configurations are invertible spatial transformations between such configurations the resampling and accompanying interpolation of pels are also invertible up to a topological limit. The normalization method of the present invention is illustrated in FIG. 5.

When more than two spatial intensity fields are normalized, increased computational efficiency may be achieved by preserving intermediate normalization calculations.

Spatial transformation models used to resample images for the purpose of registration, or equivalently for normalization, include global and local models. Global models are of increasing order from translational to projective. Local models are finite differences that imply an interpolant on a neighborhood of pels as determined basically by a block or more complexly by a piece-wise linear mesh.

Interpolation of original intensity fields to normalized intensity field increases linearity of PCA appearance models based on subsets of the intensity field.

As shown in FIG. 2, the object pels (232 & 234) can be re-sampled (240) to yield a normalized version of the object pels (242 & 244).

Mesh-Based Normalization

A further embodiment of the present invention tessellates the feature points into a triangle based mesh, the vertices of the mesh are tracked, and the relative positions of each triangle's vertices are used to estimate the three-dimensional surface normal for the plane coincident with those three vertices. When the surface normal is coincident with the projective axis of the camera, the imaged pels can provide a least-distorted rendering of the object corresponding to the triangle. Creating a normalized image that tends to favor the orthogonal surface normal can produce a pel preserving intermediate data type that will increase the linearity of subsequent appearance-based PCA models.

Another embodiment utilizes conventional block-based motion estimation to implicitly model a global motion model. In one, non-limiting embodiment, the method factors a global affine motion model from the motion vectors described by the conventional block-based motion estimation/prediction.

The present inventive method utilizes one or more global motion estimation techniques including the linear solution to a set of affine projective equations. Other projective models and solution methods are described in the prior art.

Figure 9:
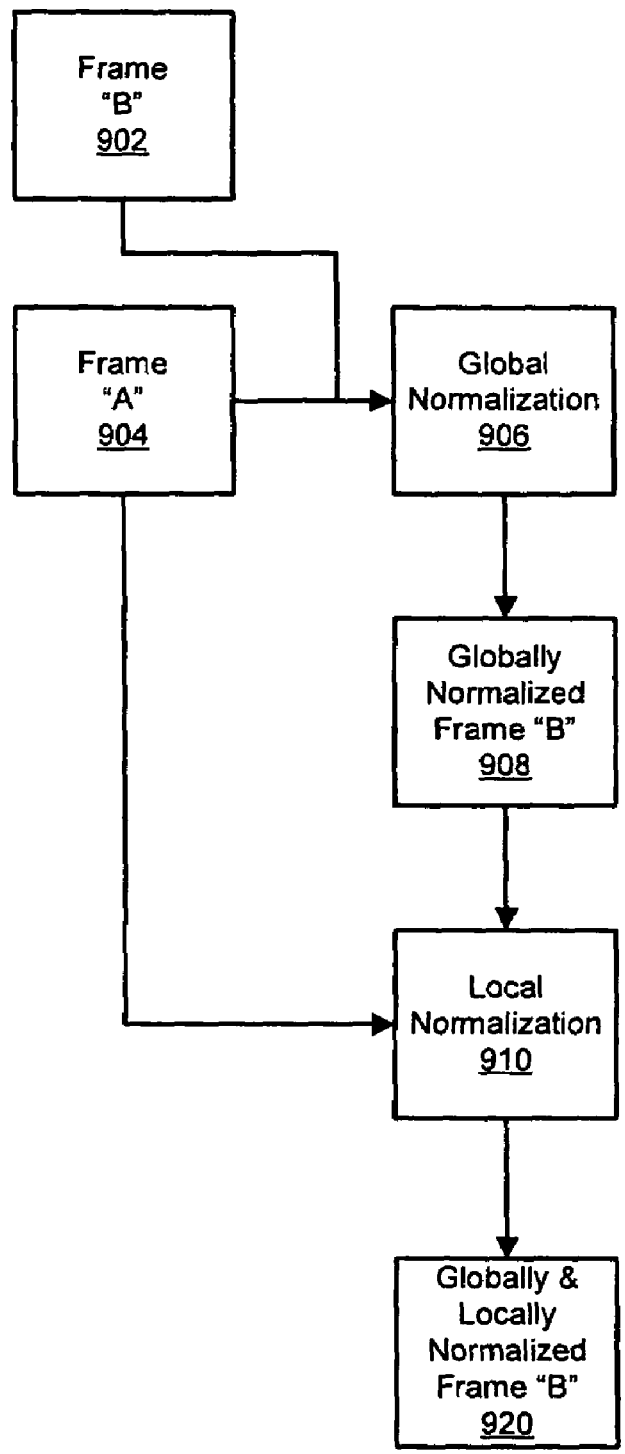
FIG. 9 is a block diagram illustrating the combined global and local normalization method of the invention.

FIG. 9 illustrates the method of combining global and local normalization.

Progressive Geometric Normalization

Classification of spatial discontinuities is used to align tessellated mesh in order to model discontinuities implicitly as they are coincident with mesh edges.

Homogeneous region boundaries are approximated by a polygon contour. The contour is successively approximated at successively lower precision in order to determine the saliency priority of each polygon vertex. Vertex priority is propagated across regions in order to preserve vertex priority for shared vertices.

In one embodiment of this invention, a polygon decomposition method allows prioritization of boundaries associated with a homogeneous classification of a field. Pels are classified according to some homogeneity criteria, such as spectral similarity, and then classification labels are spatially connected into regions. In a further preferred non-limiting embodiment, 4- or 8-connectedness criteria are applied to determine spatial connectedness.

In a preferred embodiment, the boundaries of these spatial regions are then discredited into a polygon. The spatial overlay of all the polygons for all the homogeneous regions are then tessellated and joined together into a preliminary mesh. The vertices of this mesh are decomposed using several criteria, to reveal simpler mesh representations that retain much of the perceptive saliency of the original mesh.

In a preferred embodiment, an image registration method, as disclosed in another part of this specification, is biased towards these high priority vertices with strong image gradients. Resulting deformation models tend to preserve spatial discontinuities associated with the geometry of the imaged object.

In a preferred embodiment, active contours are used to refine region boundaries. The active contour for each polygon region is allowed to propagate one iteration. The "deformation" or motion of each active contour vertex in different regions is combined in an averaging operation to allow for a constrained propagation of the implied mesh for which they all have membership.

In a preferred embodiment, vertices are assigned a count of the number of adjacent vertices it has in the mesh for adjacent vertices that are also part of the contour of a different region. These other vertices are defined as being in opposition. In the case of a vertex having a count of 1, then it has no opposing vertex, and thus needs to be preserved. If a 2 adjacent opposing vertices both have a count of 1 (meaning that these 2 vertices are in different polygons, and are adjacent to each other), then one vertex is resolved to the other. When a vertex of 1 opposes a neighboring polygon vertex that has a value of 2, then vertex with a count of 1 is resolved into the vertex with a count of 2, and that vertex count goes to 1. So if another neighboring opposing vertex is present, then this vertex can be resolved again. For this case, it is important to save the original vertex count, so that when a vertex is resolved, we can bias the direction of resolving based on the original vertex count. This is so that vertex a gets resolved to vertex b, then vertex b, won't get resolved to vertex c, instead vertex c should get resolved to vertex b since b has been used already in one resolution.

In a preferred embodiment, T-junction points are processed specifically. These are points in polygon that have no point in the adjacent polygon. In this case, each polygon vertex is first plotted on a image point map, this map identifies the spatial position of the vertex and its polygon identifier. Then each polygon perimeter is traversed, and tested to see if there are any adjacent vertices from another polygon. If there are neighboring vertices from another region, then they are each tested to see if they already have a neighboring vertex from the current polygon. If they don't then the current point is added as vertex of the current polygon. This extra test ensures that isolated vertices in another polygon are used to generate the T-junction points. Otherwise, this would just add new vertices where this region already had a matching vertex. So an opposing vertex is added only if the neighboring vertex is not opposed by this current region. In a further embodiment, the efficiency of detecting T-junctions is increased through employing a mask image. The polygons vertices are visited sequentially, and the mask is updated such that the pels of the vertices are identified as belonging to a polygon vertex. Then the polygon perimeter pels are traversed and if they coincide with a polygon vertex, then they are recorded as a vertex within the current polygon.

In a preferred embodiment, when a spectral region has been remapped by one or more overlapping homogenous image gradient regions, and another homogenous spectral region also overlaps, then all of the regions that were remapped previously are given the same label as those regions that are currently being remapped. So in essence, if a spectral region is overlapped by two homogenous regions, then all of the spectral regions that are overlapped by those two homogenous regions will get the same label, thus it is like that the one spectral region is really covered by one homogenous region instead of the two homogenous regions.

In one embodiment of the invention, it is advantageous to process region maps rather than region lists for the purpose of finding adjacency merge criteria. In a further embodiment, the spectral segmentation classifier can be modified to train the classifier using non-homogenous regions. This allows the processing to focus on the edges of the spectral regions. Additionally, adding different segmentation based on using edges, such as the canny edge detector, and then feeding that to active contour to identify the initial set of polygons allows for greater discrimination of homogeneous regions.

Local Normalization

The present invention provides a means by which pels in the spatiotemporal stream can be registered in a 'local' manner.

One such localized method employs the spatial application of a geometric mesh to provide a means of analyzing the pels such that localized coherency in the imaged phenomena are accounted for when resolving the apparent image brightness constancy ambiguities in relation to the local deformation of the imaged phenomena, or specifically an imaged object.

Such a mesh is employed to provide a piece-wise linear model of surface deformation in the image plane as a means of local normalization. The imaged phenomena may often correspond to such a model when the temporal resolution of the video stream is high compared with the motion in the video. Exceptions to the model assumptions are handled through a variety of techniques, including: topological constraints, neighbor vertex restrictions, and analysis of homogeneity of pel and image gradient regions.

In one embodiment, feature points are used to generate a mesh constituted of triangular elements whose vertices correspond to the feature points. The corresponding feature points is other frames imply an interpolated "warping" of the triangles, and correspondingly the pels, to generate a local deformation model.

Figure 7:
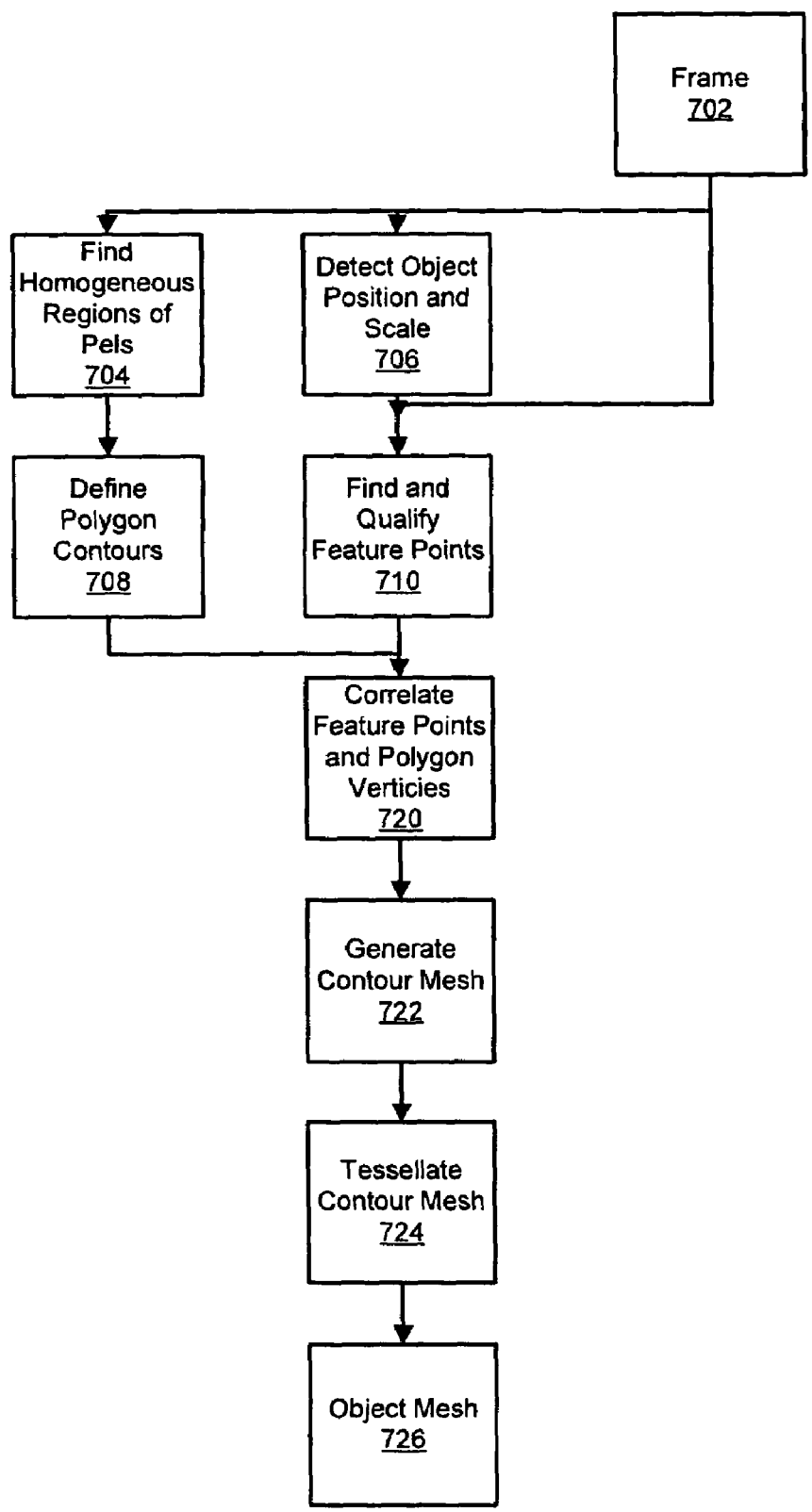
FIG. 7 is a block diagram illustrating the mesh generation method of the invention employed in local normalization.
Figure 8:
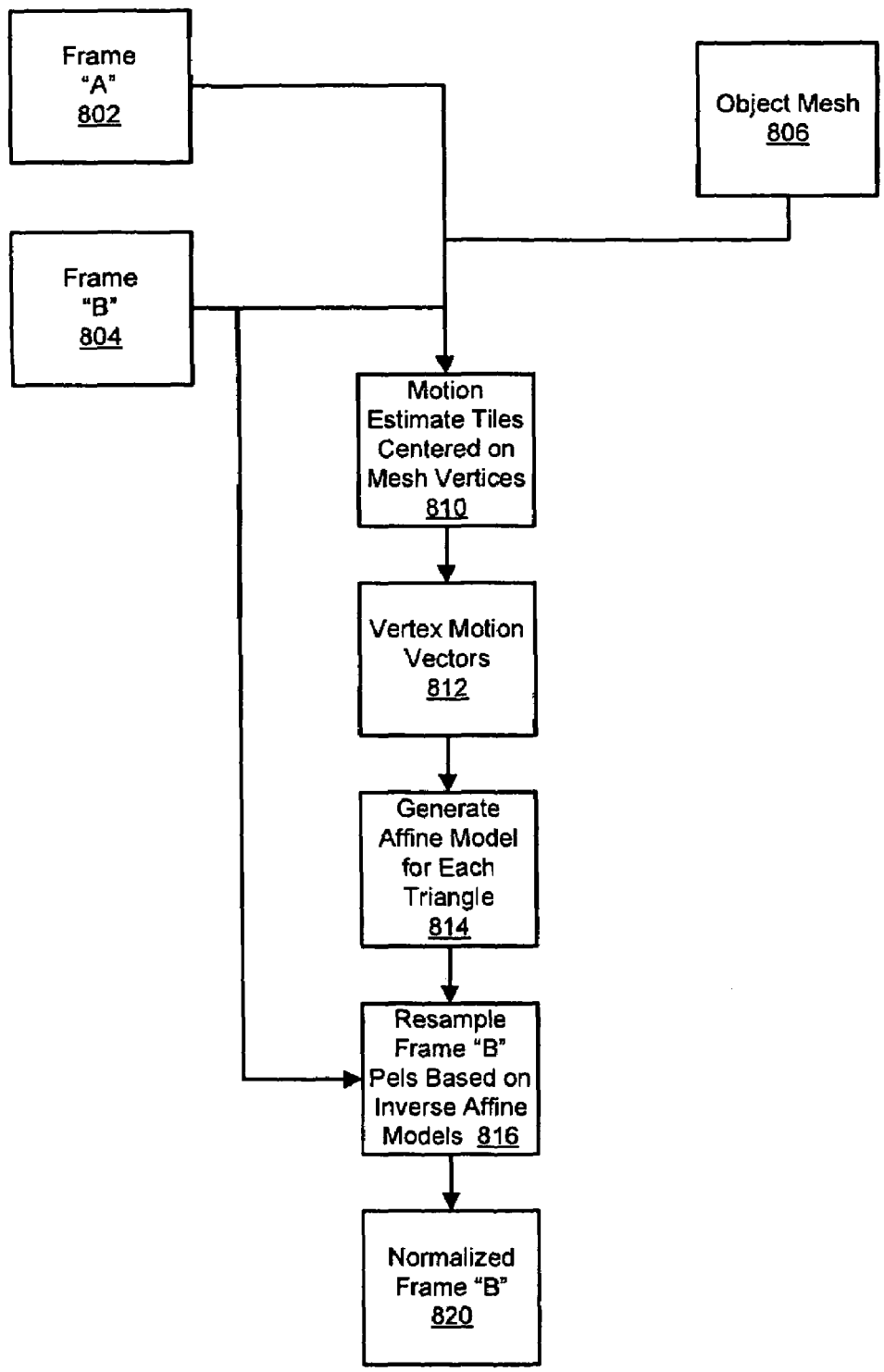
FIG. 8 is a block diagram illustrating the mesh based normalization method of the invention employed in local normalization.

FIG. 7 illustrates the generation of such an object mesh. FIG. 8 illustrates the use of such an object mesh to locally normalize frames.

In one preferred embodiment, a triangle map is generated which identifies the triangle that each pel of the map comes from. Further, the affine transform corresponding to each triangle is pre-computed as an optimization step. And further, when creating the local deformation model, the anchor image (previous) is traversed using the spatial coordinates to determine the coordinates of the source pel to sample. This sampled pel will replace the current pel location.

In another embodiment, local deformation is preformed after global deformation. In a previously disclosed specification above, Global Normalization was described as the process by which a Global Registration method is used to spatially normalize pels in two or more frames of video. The resulting globally normalized video frames can further be locally normalized. The combination of these two methods constrains the local normalization to a refinement of the globally arrived at solution. This can greatly reduce the ambiguity that the local method is required to resolve.

In another non-limiting embodiment, feature points, or in the case of a "regular mesh"—vertex points, are qualified through analysis of the image gradient in the neighborhood of those points. This image gradient can be calculated directly, or through some indirect calculation such as a Harris response. Additionally, these points can be filtered by a spatial constraint and motion estimation error associated with a descent of the image gradient. The qualified points can be used as the basis for a mesh by one of many tessellation techniques, resulting in a mesh whose elements are triangles. For each triangle, an affine model is generated based on the points and their residual motion vector.

The present inventive method utilizes one or more image intensity gradient analysis methods, including the Harris response. Other image intensity gradient analysis methods are described in the prior art.

In a preferred embodiment, a list of the triangles affine parameters is maintained. The list is iterated and a current/previous point list is constructed (using the a vertex look up map). The current/previous point list is passed to a routine that is used to estimate the transform, which computes the affine parameters for that triangle. The affine parameters, or model, are then saved in the triangle affine parameter list.

In a further embodiment, the method traverses a triangle identifier image map, where each pel in the map contains the identifier for the triangle in the mesh for which the pel has membership. And for each pel that belongs to a triangle, the corresponding global deformation, and local deformation coordinates for that pel are calculated. Those coordinates, in turn, are used to sample the corresponding pel and to apply its value in the corresponding "normalize" position.

In a further embodiment, spatial constraints are applied to the points based on density and the image intensity correspondence strength resulting from the search of the image gradient. The points are sorted after motion estimation is done based on some norm of the image intensity residual. Then the points are filtered based on a spatial density constraint.

In a further embodiment, spectral spatial segmentation is employed, and small homogeneous spectral regions are merged based on spatial affinity, similarity of their intensity and/or color, with neighboring regions. Then homogenous merging is used to combine spectral regions together based on their overlap with a region of homogenous texture (image gradient). A further embodiment then uses center-surround points, those were a small region is surrounded by a larger region, as qualified interest points for the purpose of supporting a vertex point of the mesh. In a further non-limiting embodiment, a center surround point is defined as a region whose bounding box is within one pel of being 3×3 or 5×5 or 7×7 pels in dimension, and the spatial image gradient for that bounding box is a corner shape. The center of the region can be classified as a corner, further qualifying that position as an advantageous vertex position.

In a further embodiment, the horizontal and vertical pel finite difference images are used to classify the strength of each mesh edge. If an edge has many finite differences coincident with its spatial position, then the edge, and hence the vertices of that edge are considered to be highly critical to the local deformation of the imaged phenomena. If there is a large derivative difference between the averages of the sums of the finite differences of the edge, then mostly likely the region edge corresponds to a texture change edge, and not a quantization step.

In a further embodiment, a spatial density model termination condition is employed to optimize the processing of the mesh vertices. When a sufficient number of points have been examined that covers most of the spatial area of an outset of the detection rectangle, then the processing can be terminated. The termination generates a score. Vertex and feature points entering the processing are sorted by this score. If the point is too spatially close to an existing point, or if the point does not correspond to an edge in the image gradient, then it is discarded. Otherwise, the image gradient in the neighborhood of the point is descended, and if the residual of the gradient exceeds a limit, then that point is also discarded.

In a preferred embodiment, the local deformation modeling is performed iteratively, converging on a solution as the vertex displacements per iteration diminish.

In another embodiment, local deformation modeling is performed, and the model parameters are discarded if the global deformation has already provided the same normalization benefit.

Regular Mesh Normalization

The present invention extends the aforementioned Local Normalization method utilizing a regular mesh. This mesh is constructed without regard to the underlying pels, yet it is positioned and sized corresponding to a detected object.

Given a detected object region, a spatial frame position and a scale indicating the size of the face, generate a regular mesh over an outset of the face region. In a preferred embodiment, use a non-overlapping set of tiles to delineate a rectangular mesh and then perform a diagonal partitioning of the tiles to yield a regular mesh having triangular mesh elements. In a further preferred embodiment, tiles are proportional to those used in conventional video compression algorithms (e.g. MPEG-4 AVC).

In a preferred embodiment, Vertices associated with the aforementioned mesh are prioritized through analysis of the pel regions surrounding these vertices in specific frames of the video used for training. Analysis of the gradient of such regions provides a confidence regarding processing associated with each vertex that would rely on the local image gradient (such as block-based motion estimation).

Correspondences of vertex positions in multiple frames are found through a simple descent of the image gradient. In a preferred embodiment this is achieved through block-based motion estimates. In the present embodiment high confidence vertices allow for high confidence correspondences. Lower confidence vertex correspondences are arrived at implicitly through resolving ambiguous image gradients through inference from higher confidence vertex correspondences.

In one preferred embodiment, a regular mesh is made over the outset tracking rectangle. Tiles are created 16×16, and are cut diagonally, to form a triangular mesh. The vertices of these triangles are motion estimated. The motion estimation depends on the type of texture that each point has. The texture is divided into three classes, corner, edge, and homogenous, which also defines the order of processing of the vertices. A corner vertex uses neighboring vertex estimation, i.e. the motion estimates of the neighboring points (if available) are used for predictive motion vectors, and motion estimation is applied to each one. The motion vector that provides the lowest mad error is used as this vertex motion vector. The search strategy used for the corner is all (wide, small, and origin). For edges, again the nearest neighbor motion vectors are used as predictive motion vectors, and the one with the least amount of error is used. The search strategy for edges is small and origin. For homogenous the neighboring vertices are searched and the motion estimate with the lowest error is used.

In one preferred embodiment, the image gradient for each triangle vertex is calculated, and sorted based on the class and magnitude. So corners are before edges, which are before homogenous. For corners, strong corners are before weak corners, and for edges, strong edges are before weak edges.

In one preferred embodiment, the local deformation for each triangle is based on a motion estimate associated with that triangle. Each triangle has an affine estimated for it. If the triangle doesn't topologically invert, or become degenerate, then the pels that are part of the triangle are used to sample the current image, based on the estimate affine obtained.

Segmentation

The spatial discontinuities identified through the further described segmentation processes are encoded efficiently through geometric parameterization of their respective boundaries, referred to as spatial discontinuity models. These spatial discontinuity models may be encoded in a progressive manner allowing for ever more concise boundary descriptions corresponding to subsets of the encoding. Progressive encoding provides a robust means of prioritizing the spatial geometry while retaining much of the salient aspects of the spatial discontinuities.

A preferred embodiment of the present invention combines a multi-resolution segmentation analysis with the gradient analysis of the spatial intensity field and further employs a temporal stability constraint in order to achieve a robust segmentation.

As shown in FIG. 2, once the correspondences of feature of an object have been tracked over time (220) and modeled (224), adherence to this motion/deformation model can be used to segment the pels corresponding to the object (230). This process can be repeated for a multitude of detected objects (206 & 208) in the video (202 & 204). The results of this processing are the segmented object pels (232).

One form of invariant feature analysis employed by the present invention is focused on the identification of spatial discontinuities. These discontinuities manifest as edges, shadows, occlusions, lines, corners, or any other visible characteristic that causes an abrupt and identifiable separation between pels in one or more imaged frames of video. Additionally, subtle spatial discontinuities between similarly colored and/or textured objects may only manifest when the pels of the objects in the video frame are undergoing coherent motion relative to the objects themselves, but different motion relative to each other. The present invention utilizes a combination of spectral, texture, and motion segmentation to robustly identify the spatial discontinuities associated with a salient signal mode.

Temporal Segmentation

The temporal integration of translational motion vectors, or equivalently finite difference measurements in the spatial intensity field, into a higher-order motion model is a form of motion segmentation that is described in the prior art.

In one embodiment of the invention, a dense field of motion vectors is produced representing the finite differences of object motion in the video. These derivatives are grouped together spatially through a regular partitioning of tiles or by some initialization procedure such as spatial segmentation. The "derivatives" of each group are integrated into a higher order motion model using a linear least squares estimator. The resulting motion models are then clustered as vectors in the motion model space using the k-means clustering technique. The derivatives are classified based on which cluster best fits them. The cluster labels are then spatially clustered as an evolution of the spatial partitioning. The process is continued until the spatial partitioning is stable.

In a further embodiment of the invention, motion vectors for a given aperture are interpolated to a set of pel positions corresponding to the aperture. When the block defined by this interpolation spans pels corresponding to an object boundary, the resulting classification is some anomalous diagonal partitioning of the block.

In the prior art, the least squares estimator used to integrate the derivatives is highly sensitive to outliers. The sensitivity can generate motion models that heavily bias the motion model clustering method to the point that the iterations diverge widely.

In the present invention the motion segmentation methods identify spatial discontinuities through analysis of apparent pel motion over two or more frames of video. The apparent motion is analyzed for consistency over the frames of video and integrated into parametric motion models. Spatial discontinuities associated with such consistent motion are identified. Motion segmentation can also be referred to as temporal segmentation, because temporal changes may be caused by motion. However, temporal changes may also be caused by some other phenomena such as local deformation, illumination changes, etc.

Through the described method, the salient signal mode that corresponds to the normalization method can be identified and separated from the ambient signal mode (background or non-object) through one of several background subtraction methods. Often, these methods statistically model the background as the pels that exhibit the least amount of change at each time instance. Change can be characterized as a pel value difference.

Segmentation perimeter-based global deformation modeling is achieved by creating a perimeter around the object, then collapsing the perimeter toward the detected center of the object until perimeter vertices have achieved a position coincident with a heterogeneous image gradient. Motion estimates are gathered for these new vertex positions, and robust affine estimation is used to find the global deformation model.

Integration of segmented mesh vertex image gradient descent-based finite differences into global deformation model.

Object Segmentation

Figure 13:
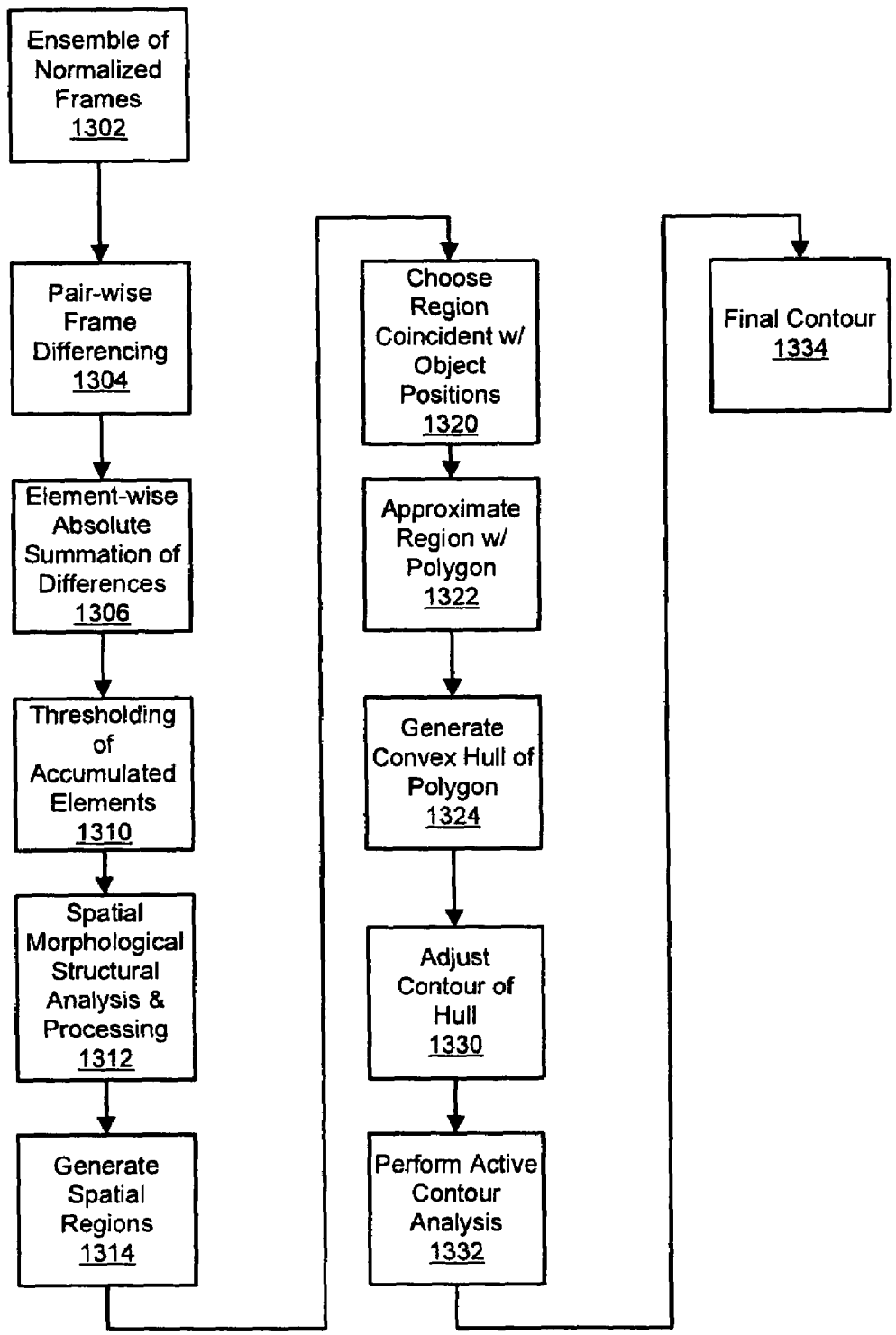
FIG. 13 is a block diagram illustrating the object segmentation method of the invention.

The block diagram shown in FIG. 13 shows one preferred embodiment of object segmentation. The process shown begins with an ensemble of normalized images (1302) that are then pair-wise differenced (1304) among the ensemble. These differences are then element-wise accumulated (1306) into an accumulation buffer. The accumulation buffer is thresholded (1310) in order to identify the more significant error regions. The thresholded element mask is then morphologically analyzed (1312) in order to determine the spatial support of the acculated error regions (1310). The resulting extraction (1314) of the morphological analysis (1312) is then compared with the detected object position (1320) in order to focus subsequent processing on accumulated error regions that are coincident with the object. The isolated spatial region's (1320) boundary is then approximated with a polygon (1322) of which a convex hull is generated (1324). The contour of the hull is then adjusted (1332) in order to better initialize the vertices' positions for active contour analysis (1332). Once the active contour analysis (1332) has converged on a low energy solution in the accumulated error space, the contour is used as the final contour (1334) and the pels constrained in the contour are considered those that are most likely object pels, and those pels outside of the contour are considered to be non-object pels.

In a preferred embodiment, motion segmentation can be achieved given the detected position and scale of the salient image mode. A distance transform can be used to determine the distance of every pel from the detected position. If the pel values associated with the maximum distance are retained, a reasonable model of the background can be resolved. In other words, the ambient signal is re-sampled temporally using a signal difference metric.

A further embodiment includes employing a distance transform relative to the current detection position to assign a distance to each pel. If the distance to a pel is greater than the distance in some maximum pel distance table, then the pel value is recorded. After a suitable training period, the pel is assumed to have the highest probability of being a background pel if the maximum distance for that pel is large.

Given a model of the ambient signal, the complete salient signal mode at each time instance can be differenced. Each of these differences can be re-sampled into spatially normalized signal differences (absolute differences). These differences are then aligned relative to each other and accumulated. Since these differences have been spatially normalized relative to the salient signal mode, peaks of difference will mostly correspond to pel positions that are associated with the salient signal mode.

In one embodiment of the invention, a training period is defined where object detection positions are determined and a centroid of those positions is used to determine optimal frame numbers with detection positions far from this position that would allow for frame differencing to yield background pels that would have the highest probability of being non-object pels.

In one embodiment of the present invention, active contour modeling used to segment the foreground object from the non-object background by determining contour vertex positions in accumulated error "image". In a preferred embodiment the active contour edges are subdivided commensurate with the scale of the detected object to yield a greater degree of freedom. In a preferred embodiment, the final contour positions can be snapped to a nearest regular mesh vertex in order to yield a regularly spaced contour.

In one non-limiting embodiment of object segmentation, an oriented kernel is employed for generating error image filter responses for temporally pair-wise images. Response to the filter that is oriented orthogonal to the gross motion direction tends to enhance the error surface when motion relative to the background occurs from occlusion and revealing of the background.

The normalized image frame intensity vectors of an ensemble of normalized images are differenced from one or more reference frame creating residual vectors. These residual vectors are accumulated element-wise to form an accumulated residual vector. This accumulated residual vector is then probed spatially in order to define a spatial object boundary for spatial segmentation of the object and non-object pels.

In one preferred embodiment, an initial statistical analysis of the accumulated residual vector is performed to arrive at a statistical threshold value that can be used to threshold the accumulated residual vector. Through an erosion and subsequent dilation morphological operation, a preliminary object region mask is created. The contour polygon points of the region are then analyzed to reveal the convex hull of those points. The convex hull is then used as an initial contour for an active contour analysis method. The active contour is the propagated until it converges on the spatial boundaries of the object's accumulated residual. In a further preferred embodiment, the preliminary contour's edges are further subdivided by adding midpoint vertices until a minimal edge length is achieved for all the edge lengths. This further embodiment is meant to increase the degrees of freedom of the active contour model to more accurately fit the outline of the object.

In a preferred embodiment, the refined contour is used to generate a pel mask indicating the pels of the object by overlaying the polygon implied by the contour and overlaying the polygon in the normalized images.

Resolution of Non-Object

Figure 12:
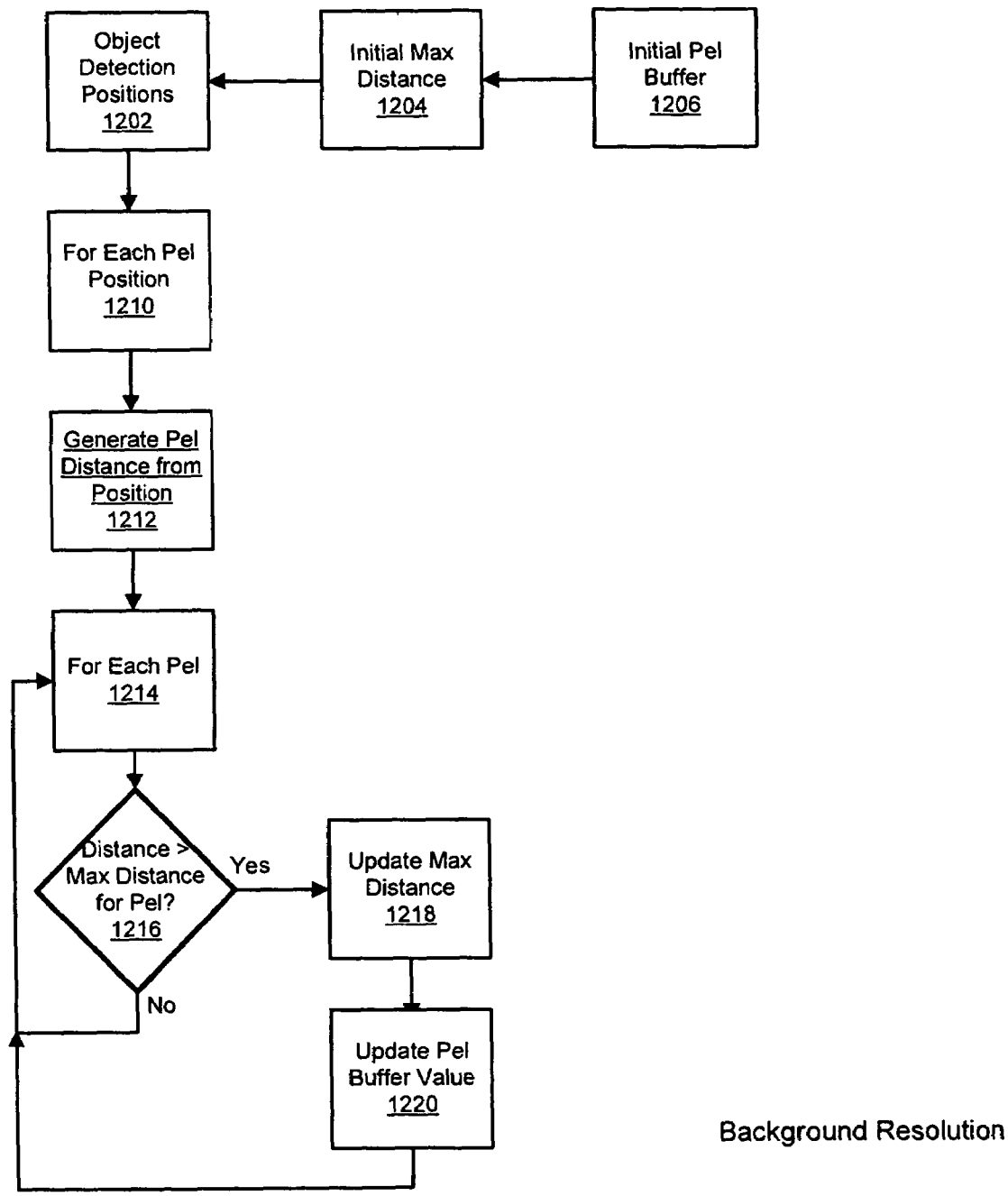
FIG. 12 is a block diagram illustrating the background resolution method.

The block diagram shown in FIG. 12 discloses one preferred embodiment of non-object segmentation, or equivalently background resolution. With the initialization of a background buffer (1206) and an initial maximum distance value (1204) buffer, the process works to determine the most stable non-object pels by associating "stability" with the greatest distance from the detected object position (1202). Given a new detected object position (1202), the process checks each pel position (1210). For each pel position (1210), the distance from the detected object position (1210) is calculated using a distance transform. If the distance for that pel is greater (1216) than the previously stored position in the maximum distance buffer (1204) then the previous value is replace with the current value (1218) and the pel value is recorded (1220) in the pel buffer.

Given a resolved background image, the error between this image and the current frame can be normalized spatially and accumulated temporally. Such a resolved background image is described in the "background resolution" section. The resolution of the background through this method is considered a time-based occlusion filter process.

The resulting accumulated error is then thresholded to provide an initial contour. The contour is then propagated spatially to balance error residual against contour deformation.

In an alternative embodiment, absolute differences between the current frame and the resolved background frames is computed. The element-wise absolute difference is then segmented into distinct spatial regions. These regions bounding boxes average pel value is computed, so that when the resolved background is updated, the difference between the current and resolved background average pel value can be used to perform a contrast shift, so that the current region can blend in more effectively with the resolved background. In another embodiment, the vertices within the normalized frame mask are motion estimated and saved for each frame. These are then processed using SVD to generate a local deformation prediction for each of the frames.

Gradient Segmentation

The texture segmentation methods, or equivalently, intensity gradient segmentation, analyze the local gradient of the pels in one or more frames of video. The gradient response is a statistical measure which characterizes the spatial discontinuities local to a pel position in the video frame. One of several spatial clustering techniques is then used to combine the gradient responses into spatial regions. The boundaries of these regions are useful in identifying spatial discontinuities in one or more of the video frames.

In one embodiment of the invention, the summed area table concept from computer graphics texture generation is employed for the purpose of expediting the calculation of the gradient of the intensity field. A field of progressively summed values is generated facilitating the summation of any rectangle of the original field through four lookups combined with four addition operations.

A further embodiment employs the Harris response which is generated for an image and the neighborhood of each pel is classified as being either homogeneous, an edge, or a corner. A response value is generated from this information and indicates the degree of edge-ness or cornered-ness for each element in the frame.

Multi-Scale Gradient Analysis

An embodiment of the present invention further constrains the image gradient support by generating the image gradient values through several spatial scales. This method can help qualify the image gradient such that spatial discontinuities at different scales are used to support each other—as long as an "edge" is discriminated at several different spatial scales, the edge should be "salient". A more qualified image gradient will tend to correspond to a more salient feature.

In a preferred embodiment, the texture response field is first generated, the values of this field are then quantized into several bins based on a k-means binning/partitioning. The original image gradient values are then progressively processed using each bin as an interval of values to which a single iteration can apply watershed segmentation. The benefit of such an approach is that homogeneity is defined in a relative sense with a strong spatial bias.

Spectral Segmentation

The spectral segmentation methods analyze the statistical probability distribution of the black and white, grayscale, or color pels in the video signal. A spectral classifier is constructed by performing clustering operations on the probability distribution of those pels. The classifier is then used to classify one or more pels as belonging to a probability class. The resulting probability class and its pels are then given a class label. These class labels are then spatially associated into regions of pels with distinct boundaries. These boundaries identify spatial discontinuities in one or more of the video frames.

The present invention may utilize spatial segmentation based on spectral classification to segment pels in frames of the video. Further, correspondence between regions may be determined based on overlap of spectral regions with regions in previous segmentations.

It is observed that when video frames are roughly made up of continuous color regions that are spatially connected into larger regions that correspond to objects in the video frame, identification and tracking of the colored (or spectral) regions can facilitate the subsequent segmentation of objects in a video sequence.

Background Segmentation

The described invention includes a method for video frame background modeling that is based on the temporal maximum of spatial distance measurements between a detected object and each individual pel in each frame of video. Given the detected position of the object, the distance transformation is applied, creating a scalar distance value for each pel in the frame. A map of the maximum distance over all of the video frames for each pel is retained. When the maximum value is initially assigned, or subsequently updated with a new and different value, the corresponding pel for that video frame is retained in a "resolved background" frame.

Appearance Modeling

A common goal of video processing is often to model and preserve the appearance of a sequence of video frames. The present invention is aimed at allowing constrained appearance modeling techniques to be applied in robust and widely applicable ways through the use of preprocessing. The registration, segmentation, and normalization described previously are expressly for this purpose.

The present invention discloses a means of appearance variance modeling. The primary basis of the appearance variance modeling is, in the case of a linear model, the analysis of feature vectors to reveal compact basis exploiting linear correlations. Feature vectors representing spatial intensity field pels can be assembled into an appearance variance model.

In an alternative embodiment, the appearance variance model is calculated from a segmented subset of the pels. Further, the feature vector can be separated into spatially non-overlapping feature vectors. Such spatial decomposition may be achieved with a spatial tiling. Computational efficiency may be achieved through processing these temporal ensembles without sacrificing the dimensionality reduction of the more global PCA method.

When generating an appearance variance model, spatial intensity field normalization can be employed to decrease PCA modeling of spatial transformations.

Deformation Modeling

Local deformation can be modeled as vertex displacements and an interpolation function can be used to determine the resampling of pels according to vertices that are associated with those pels. These vertex displacements may provide a large amount of variation in motion when looked at as a single parameter set across many vertices. Correlations in these parameters can greatly reduce the dimensionality of this parameter space.

PCA

The preferred means of generating an appearance variance model is through the assembly of frames of video as pattern vectors into a training matrix, or ensemble, and application of Principal Component Analysis (PCA) on the training matrix. When such an expansion is truncated, the resulting PCA transformation matrix is employed to analyze and synthesize subsequent frames of video. Based on the level of truncation, varying levels of quality of the original appearance of the pels can be achieved.

The specific means of construction and decomposition of the pattern vectors is well known to one skilled in the art.

Given the spatial segmentation of the salient signal mode from the ambient signal and the spatial normalization of this mode, the pels themselves, or equivalently, the appearance of the resulting normalized signal, can be factored into linearly correlated components with a low rank parameterization allowing for a direct trade-off between approximation error and bit-rate for the representation of the pel appearance. One method for achieving a low rank approximation is through the truncation of bytes and/or bits of encoded data. A low rank approximation is considered a compression of the original data as determined by the specific application of this technique. For example, in video compression, if the truncation of data does not unduly degrade the perceptual quality then the application specific goal is achieved along with compression.

As shown in FIG. 2, the normalized object pels (242 & 244) can be projected into a vector space and the linear correspondences can be modeled using a decomposition process (250) such as PCA in order to yield a dimensionally concise version of the data (252 & 254).

Sequential PCA

PCA encodes patterns into PCA coefficients using a PCA transform. The better the patterns are represented by the PCA transform, the fewer coefficients are needed to encode the pattern. Recognizing that pattern vectors may degrade as time passes between acquisition of the training patterns and the patterns to be encoded, updating the transform can help to counter act the degradation. As an alternative to generating a new transform, sequential updating of existing patterns is more computationally efficient in certain cases.

Many state-of-the-art video compression algorithms predict a frame of video from one or more other frames. The prediction model is commonly based on a partitioning of each predicted frame into non-overlapping tiles which are matched to a corresponding patch in another frame and an associated translational displacement parameterized by an offset motion vector. This spatial displacement, optionally coupled with a frame index, provides the "motion predicted" version of the tile. If the error of the prediction is below a certain threshold, the tile's pels are suitable for residual encoding; and there is a corresponding gain in compression efficiency. Otherwise, the tile's pels are encoded directly. This type of tile-based, alternatively termed block-based, motion prediction method models the video by translating tiles containing pels. When the imaged phenomena in the video adheres to this type of modeling, the corresponding encoding efficiency increases. This modeling constraint assumes a certain level of temporal resolution, or number of frames per second, is present for imaged objects undergoing motion in order to conform to the translational assumption inherent in block-based prediction. Another requirement for this translational model is that the spatial displacement for a certain temporal resolution must be limited; that is, the time difference between the frames from which the prediction is derived and the frame being predicted must be a relatively short amount of absolute time. These temporal resolution and motion limitations facilitate the identification and modeling of certain redundant video signal components that are present in the video stream.

In the present inventive method, sequential PCA is combined with embedded zero-tree wavelet to further enhance the utility of the hybrid compression method. The Sequential PCA technique provides a means by which conventional PCA can be enhanced for signals that have a temporal coherency or temporally local smoothness. The embedded zero-tree wavelet provides a means by which a locally smooth spatial signal can be decomposed into a space-scale representation in order to increase the robustness of certain processing and also the computational efficiency of the algorithm. For the present invention, these two techniques are combined to increase the representation power of the variance models and also provide a representation of those models that is compact and ordered such that much of the representational power of the basis is provided by a truncation of the basis.

In another embodiment, sequential PCA is applied with a fixed input block size and fixed tolerance to increase the weighted bias to the first and most energetic PCA components. For longer data sequences this first PCA component is often the only PCA component. This affects the visual quality of the reconstruction and can limit the utility of the described approach in some ways. The present invention employs a different norm for the selection of PCA components that is preferable to the use of the conventionally used least-square norm. This form of model selection avoids the over-approximation by the first PCA component.

In another embodiment, a block PCA process with a fixed input block size and prescribed number of PCA components per data block is employed to provide beneficial uniform reconstruction traded against using relatively more components. In a further embodiment, the block PCA is used in combination with sequential PCA, where block PCA reinitializes the sequential PCA after a set number of steps with a block PCA step. This provides a beneficial uniform approximation with a reduction in the number of PCA components.

In another embodiment, the invention capitalizes on the situation where the PCA components before and after encoding-decoding are visually similar. The quality of the image sequence reconstructions before and after encoding-decoding may also be visually similar and this often depends on the degree of quantization employed. The present inventive method decodes the PCA components and then renormalizes them to have a unit norm. For moderate quantization the decoded PCA components are approximately orthogonal. At a higher level of quantization the decoded PCA components are partially restored by application of SVD to obtain an orthogonal basis and modified set of reconstruction coefficients.

In another embodiment, a variable and adaptable block size is applied with a hybrid sequential PCA method in order to produce improved results with regard to synthesis quality. The present invention bases the block size on a maximum number of PCA components and a given error tolerance for those blocks. Then, the method expands the current block size until the maximum number of PCA components is reached. In a further embodiment, the sequence of PCA components is considered as a data stream, which leads to a further reduction in the dimensionality. The method performs a post-processing step where the variable data blocks are collected for the first PCA component from each block and SVD is applied to further reduce the dimensionality. The same process is then applied to the collection of second, third, etc components.

Symetric Decomposition

In one embodiment of the invention, a decomposition is performed based on a symmetric ensemble. This ensemble represents a square image as the sum of six orthogonal components. Each component corresponds to a different symmetry of the square. By symmetry, each orthogonal component is determined by a "fundamental region" that is mapped by the action of symmetry into the complete component. The sum of the fundamental regions has the same cardinality as the input image, assuming the input image itself has no particular symmetry.

Residual-Based Decomposition

In MPEG video compression, the current frame is constructed by motion compensating the previous frame using motion vectors, followed by application of a residual update for the compensation blocks, and finally, any blocks that do not have a sufficient match are encoded as new blocks.

The pels corresponding to residual blocks are mapped to pels in the previous frame through the motion vector. The result is a temporal path of pels through the video that can be synthesized through the successive application of residual values. These pels are identified as ones that can be best represented using PCA.

Occlusion-Based Decomposition

A further enhancement of the invention determines if motion vectors applied to blocks will cause any pels from the previous frame to be occluded (covered) by moving pels. For each occlusion event, split the occluding pels into a new layer. There will also be revealed pels without a history. The revealed pels are placed onto any layer that will fit them in the current frame and for which a historical fit can be made for that layer.

The temporal continuity of pels is supported through the splicing and grafting of pels to different layers. Once a stable layer model is arrived at, the pels in each layer can be grouped based on membership to coherent motion models.

Sub-Band Temporal Quantization

An alternative embodiment of the present invention uses discrete cosine transform (DCT) or discrete wavelet transform (DWT) to decompose each frame into sub-band images. Principal component analysis (PCA) is then applied to each of these "sub-band" videos. The concept is that sub-band decomposition of a frame of video decreases the spatial variance in any one of the sub-bands as compared with the original video frame.

For video of a moving object (person), the spatial variance tends to dominate the variance modeled by PCA. Sub-band decomposition reduces the spatial variance in any one decomposition video.

For DCT, the decomposition coefficients for any one sub-band are arranged spatially into a sub-band video. For instance, the DC coefficients are taken from each block and arranged into a sub-band video that looks like a postage stamp version of the original video. This is repeated for all the other sub-bands, and the resulting sub-band videos are each processed using PCA.

For DWT, the sub-bands are already arranged in the manner described for DCT.

In a non-limiting embodiment, the truncation of the PCA coefficients is varied.

Wavelet

When a data is decomposed using the discrete Wavelet transform (DWT), multiple band-pass data sets result at lower spatial resolutions. The transformation process can be recursively applied to the derived data until only single scalar values results. The scalar elements in the decomposed structure are typically related in a hierarchical parent/child fashion. The resulting data contains a multi resolution hierarchical structure and also finite differences as well.

When DWT is applied to spatial intensity fields, many of the naturally occurring images' phenomena are represented with little perceptual loss by the first or second low band pass derived data structures due to the low spatial frequency. Truncating the hierarchical structure provides a compact representation when high frequency spatial data is either not present or considered noise.

While PCA may be used to achieve accurate reconstruction with a small number of coefficients, the transform itself can be quite large. To reduce the size of this "initial" transform, an embedded zero tree (EZT) construction of a wavelet decomposition can be used to build a progressively more accurate version of the transformation matrix.

Subspace Classification

As is well understood by those practiced in the art, discretely sampled phenomena data and derivative data can be represented as a set of data vectors corresponding to an algebraic vector space. These data vectors include, in a non-limiting way, the pels in the normalized appearance of the segmented object, the motion parameters, and any structural positions of features or vertices in two or three dimensions. Each of these vectors exists in a vector space, and the analysis of the geometry of the space can be used to yield concise representations of the sampled, or parameter, vectors. Beneficial geometric conditions are typified by parameter vectors that form compact subspaces. When one or more subspaces are mixed, creating a seemingly more complex single subspace, the constituent subspaces can be difficult to discern. There are several methods of segmentation that allow for the separation of such subspaces through examining the data in a higher dimensional vector space that is created through some interaction of the original vectors (such as inner product).

One method of segmenting the vector space involves the projection of the vectors into a Veronese vector space representing polynomials. This method is well known in the prior art as the Generalized PCA or GPCA technique. Through such a projection, the normals to the polynomials are found, grouped, and the original vectors associated with those normals can be grouped together. An example of the utility of this technique is in the factoring of two dimensional spatial point correspondences tracked over time into a three dimensional structure model and the motion of that three dimensional model.

The GPCA technique is incomplete when applied as defined, yielding results only when the data vectors are generated with little noise. The prior art assumes supervisory user intervention to guide the GPCA algorithm. This constraint greatly limits the potential of the technique.

The present invention extends the conceptual basis of the GPCA method to robustly handle the identification and segmentation of multiple subspaces in the presence of noise and mixed co-dimension. This innovation provides an unsupervised improvement of the technique over the state of the art.

In the prior art, GPCA operates on the normal vectors of the polynomials of the Veronese map without regard to the tangent space of those normal vectors. The present inventive method extends GPCA to find the tangent space orthogonal to the space of the normal vectors that are normally found in the Veronese map. This "tangent space", or subspace of the Veronese map, is then used to factor the Veronese map.

The tangent space is identified through plane wave expansions and the application of the Legendre transformation between position and tangent plane coordinates which reveals dualities in the representation of geometric objects, specifically the tangents of the normals to the polynomials of the Veronese Map. The discrete Legendre transformation is applied through convex analysis to define a constrained form of derivative corresponding to the normal vectors. This approach is used to segment the data vectors by calculation of normal vectors in the presence of noise. This convexity analysis is incorporated with GPCA to provide a more robust algorithm.

Figure 11:
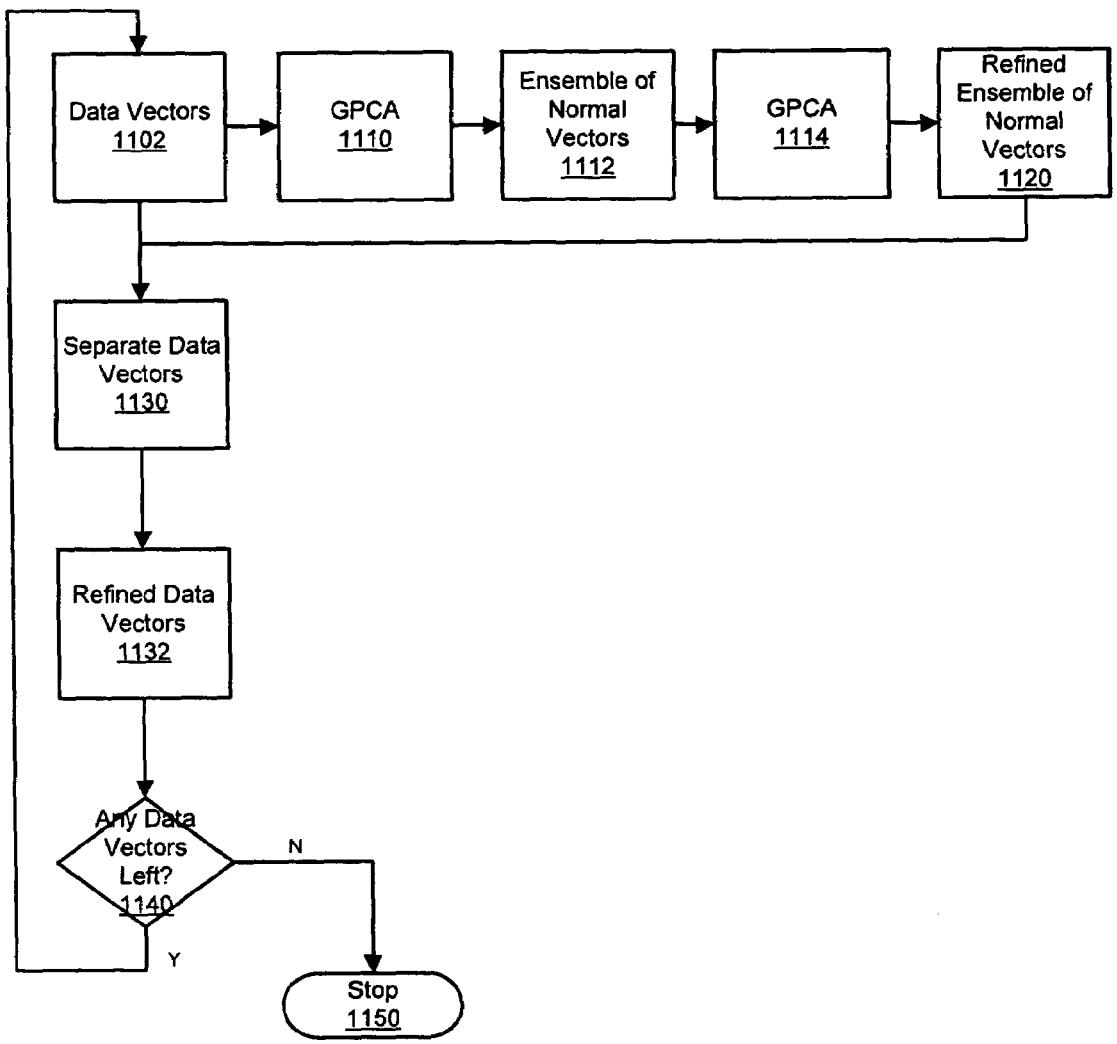
FIG. 11 is a block diagram illustrating the recursive GPCA refinement method of the invention.

The present invention capitalizes on an iterative factorization approach when applying GPCA. In particular, the derivative-based implementation found in the prior art is extended to refine the ensemble of classified data vectors through the very same GPCA method described herein. Applied iteratively, this technique can be used to robustly find candidate normal vectors in the Veronese mapping, and then further qualify those vectors using this extended GPCA technique. For the factorization step, the original data associated with the refined set of vectors is removed from the original data set. The remaining data set can likewise be analyzed with this innovated GPCA technique. This innovation is critical to using the GPCA algorithm in an unsupervised manner. FIG. 11 illustrates the recursive refinement of data vectors.

It is further recognized that the inventive extension to the GPCA technique has greater advantages in cases where there are multiple roots in the Veronese polynomial vector space. Additionally, when the prior art technique encounters the degenerate case when normals in the Veronese map are parallel to a vector space axis, the present method is not degenerate.

Figure 10:
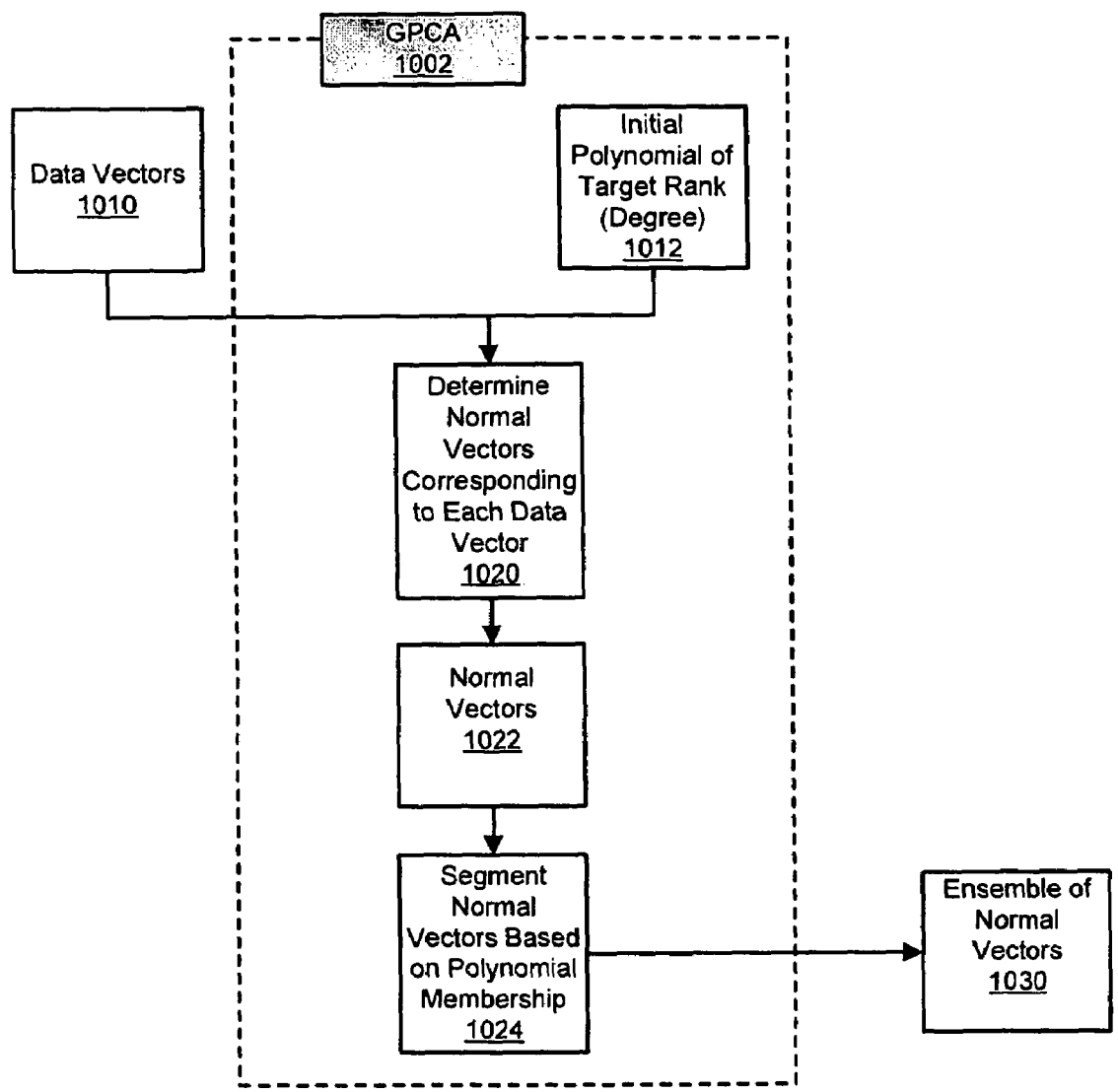
FIG. 10 is a block diagram illustrating the GPCA—basic polynomial fitting and differentiation method of the invention.

FIG. 10 illustrates the method of basic polynomial fitting and differentiation.

In a preferred embodiment, GPCA is implemented with polynomial differentiation for arbitrary co-dimension subspaces. SVD is used to get the dimension of the normal space at each data point and clusters data point according to the normal space dimension. Within each cluster, data points are assigned to the same subspace when, to a tolerance, they all belong to a maximal set with the same rank that is equal to the common normal space dimension. It is recognized that this method is optimal for data that is free of noise.

Another non-limiting embodiment of GPCA with polynomial differentiation has arbitrary co-dimension subspaces. This is an adaptation of the "polynomial differentiation" method. As noise tends to increase the rank of a set of nearly aligned normal vectors, the polynomial division step is initialized by clustering data points according to the SVD dimension and then selecting the point that has the smallest residual error in the cluster with the smallest co-dimension. The normal space at this point is then applied with the polynomial division to approximately reduce the Veronese map.

In a further embodiment, the gradient weighted residual error is minimized over all data points and SVD is applied at the optimal point to estimate co-dimension and basis vectors. The basis vectors are then applied with polynomial division to approximately reduce the Veronese map.

In a preferred embodiment, the RCOP error is used to set numerical tolerances due to it scaling linearly with noise level. In a preferred embodiment, GPCA is implemented in such a way as to apply SVD to the estimated normal vectors at each point and identify the points whose normal vector SVD has the same rank. Then a sequential SVD is applied to each collection of normal vectors at the points with the same rank. Points where the sequential SVD changes rank are identified as different subspaces.

Hybrid Spatial Normalization Compression

The present invention extends the efficiency of block-based motion predicted coding schemes through the addition of segmenting the video stream into two or more "normalized" streams. These streams are then encoded separately to allow the conventional codec's translational motion assumptions to be valid. Upon decoding the normalized streams, the streams are de-normalized into their proper position and composited together to yield the original video sequence.

In one embodiment, one or more objects are detected in the video stream and the pels associated with each individual object are subsequently segmented leaving non-object pels. Next, a global spatial motion model is generated for the object and non-object pels. The global model is used to spatially normalize object and non-object pels. Such a normalization has effectively removed the non-translational motion from the video stream and has provided a set of videos whose occlusion interaction has been minimized. These are both beneficial features of the present inventive method.

The new videos of object and the non-object, having their pels spatially normalized, are provided as input to a conventional block-based compression algorithm. Upon decoding of the videos, the global motion model parameters are used to de-normalize those decoded frames, and the object pels are composited together and onto the non-object pels to yield an approximation of the original video stream.

Figure 6:
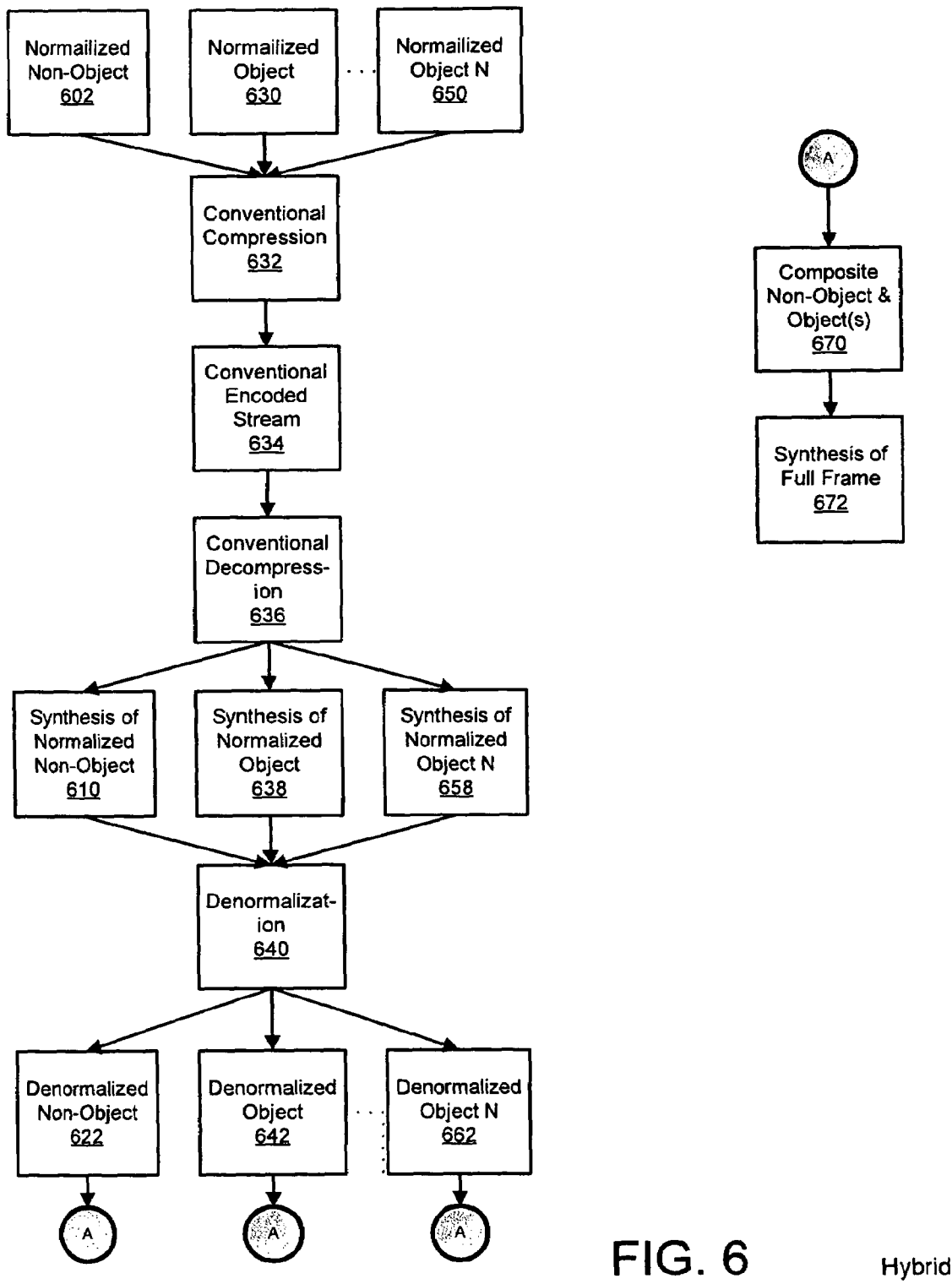
FIG. 6 is a block diagram illustrating the hybrid spatial normalization compression method.

As shown in FIG. 6, the previously detected object instances (206 & 208) for one or more objects (630 & 650), are each processed with a separate instance of a conventional video compression method (632). Additionally, the non-object (602) resulting from the segmentation (230) of the objects, is also compressed using conventional video compression (632). The result of each of these separate compression encodings (632) are separate conventional encoded streams for each (634) corresponding to each video stream separately. At some point, possibly after transmission, these intermediate encoded streams (234) can be decompressed (636) into a synthesis of the normalized non-object (610) and a multitude of objects (638 & 658). These synthesized pels can be de-normalized (640) into their de-normalized versions (622, 642 & 662) to correctly position the pels spatially relative to each other so that a compositing process (670) can combine the object and non-object pels into a synthesis of the full frame (672).

In a preferred embodiment, the switching between encoding modes is performed based on a statistical distortion metric, such as PSNR, that would allow conventional versus the subspace method to encode the frames of video.

In another embodiment of the invention, the encoded parameters of the appearance, global deformation, and local deformation are interpolated to yield predictions of intermediate frames that would not otherwise have to be encoded. The interpolation method can be any of the standard interpolation methods such as linear, cubic, spline, etc.

Figure 14:
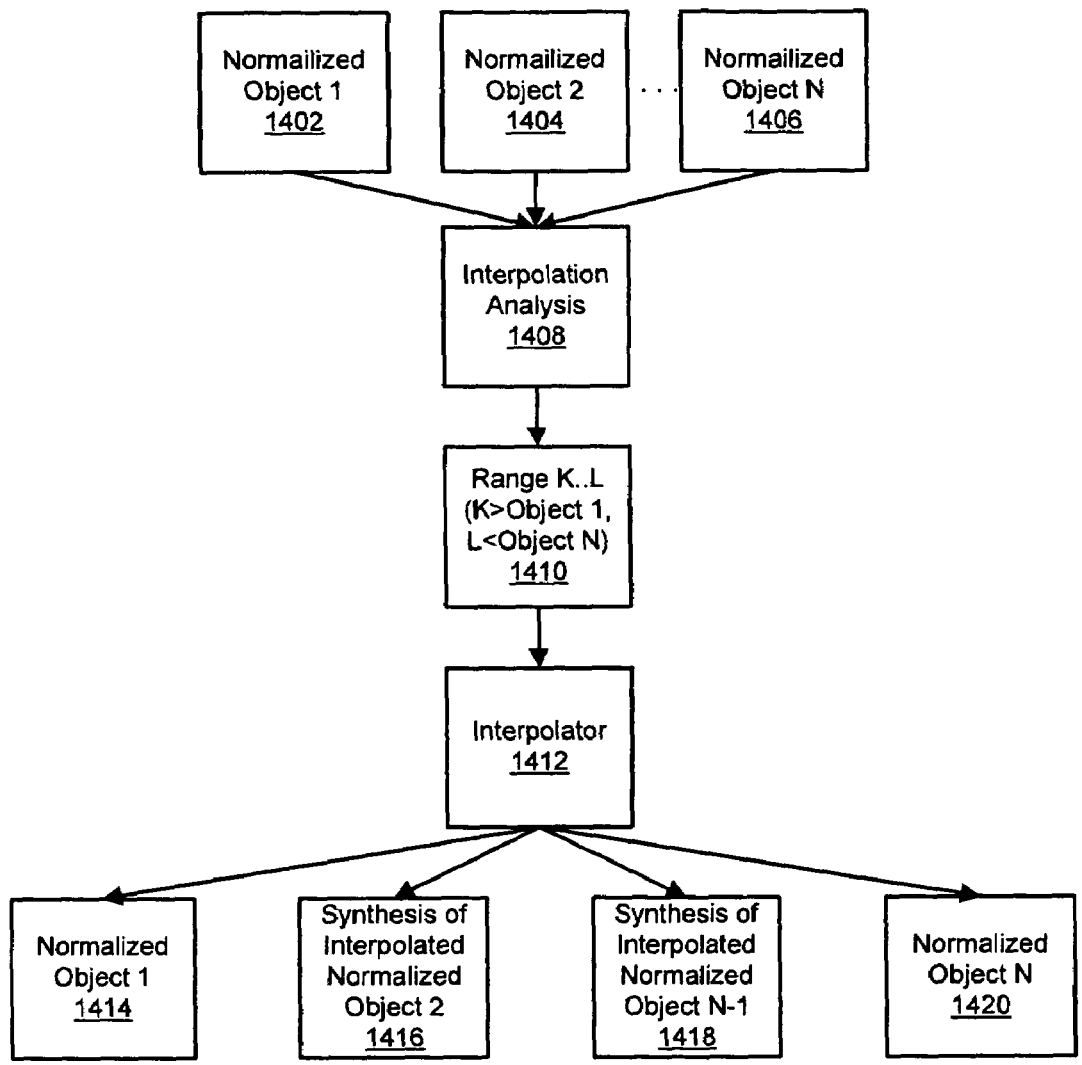
FIG. 14 is a block diagram illustrating the object interpolation method of the invention.

As shown in FIG. 14, the object interpolation method can be achieved through the interpolation analysis (1408) of a series of normalized objects (1402,1404, &1406) as represented by appearance and deformation parameters. The analysis determines the temporal range (1410) over which an interpolating function can be applied. The range specification (1410) can then be combined with the normalized object specifications (1414 & 1420) in order to approximate and ultimately synthesize the interim normalized objects (1416 & 1418).

Integration of Hybrid Codec

In combining a conventional block-based compression algorithm and a normalization-segmentation scheme, as described in the present invention, there are several inventive methods that have resulted. Primarily, there are specialized data structures and communication protocols that are required.

The primary data structures include global spatial deformation parameters and object segmentation specification masks. The primary communication protocols are layers that include the transmission of the global spatial deformation parameters and object segmentation specification masks.

We claim:

1. A computer-implemented method of generating an encoded form of video signal data from a plurality of video frames, the method comprising:

detecting at least one object in the two or more video frames;

tracking the at least one object through the two or more frames of the video frames;

segmenting the pel data associated with the at least one object from other pel data in the two or more video frames so as to generate a second intermediate form of the data, the segmenting utilizing a spatial segmentation of the pel data; and identifying corresponding elements of at least one object in two or more of the video frames;

analyzing the corresponding elements to generate relationships between the corresponding elements;

generating correspondence models by using the relationships between the corresponding elements;

integrating the relationships between the corresponding elements into a model of global motion; and re-sampling pel data associated with the at least one object in the two or more video frames by utilizing the correspondence models, thereby generating re-sampled pel data, the re-sampled pel data representing a first intermediate form of the data; and restoring the spatial positions of the re-sampled pel data by utilizing the correspondence models, thereby generating restored pels; and recombining the restored pels together with an associated portion of the second intermediate form of the data to create an original video frame; and wherein no detection would indicate an indirect detection for the whole frame; and wherein the detecting and tracking comprise using a face detection algorithm; and wherein generating correspondence models comprises using a robust estimator for the solution of a multi-dimensional projective motion model, and wherein analyzing the corresponding elements comprises using an appearance-based motion estimation between two or more of the video frames.

2. The method of claim 1 comprising encoding the first intermediate form of the data, the encoding comprising;

decomposing the re-sampled pel data into an encoded representation, the encoded representation representing a third intermediate form of the data; and truncating zero or more bytes of the encoded representation; and recomposing the re-sampled pel data from the encoded representation;

wherein each of the decomposing and the recomposing uses Principal Component Analysis.

3. The method of claim 1 comprising a method of factoring the correspondence models into global models, the method comprising:

integrating the relationships between the corresponding elements into a model of global motion;

decomposing the re-sampled pel data into an encoded representation, the encoded representation representing a fourth intermediate form of the data; and truncating zero or more bytes of the encoded representation; and recomposing the re-sampled pel data from the encoded representation; wherein each of the decomposing and the recomposing uses Principal Component Analysis;

wherein generating correspondence models comprises using a robust estimator for the solution of a multi-dimensional projective motion model, and wherein analyzing the corresponding elements comprises using a sampling population based on finite differences generated from a block-based motion estimation between two or more of the video, frames.

4. The method of claim 3 wherein each of the two or more video frames comprises object pels and non-object pels, the method comprising:

identifying corresponding elements in the non-object pels in two or more of the video frames:

analyzing the corresponding elements in the non-object pels to generate relationships between the corresponding elements in the non-object pels; generating second correspondence models by using the relationships between the corresponding elements in the non-object pels;

wherein the analysis of the corresponding elements includes a time-based occlusion filter.

5. The method of claim 4 comprising:

factoring the correspondence models into global models;

integrating the relationships between the corresponding elements into a model of global motion;

decomposing the re-sampled pel data into an encoded representation, the encoded representation representing a fifth intermediate form of the data; and truncating zero or more bytes of the encoded representation; and recomposing the re-sampled pel data from the encoded representation;

wherein each of the decomposing and the recomposing uses a conventional video compression/decompression process;

wherein generating correspondence models comprises using a robust estimator for the solution of a multi-dimensional projective motion model, and wherein analyzing the corresponding elements comprises using a sampling population based on finite differences generated from a block-based motion estimation between two or more of the video frames.

6. The method of claim 4 comprising a method of factoring the correspondence models into global models, the method comprising:

(a) integrating the relationships between the corresponding elements into a model of global motion;

(b) performing subspace segmentation on a sort of the data vectors; and (c) constraining subspace segmentation criteria through application of a tangent vector analysis in an implicit vector space;

(d) retaining a subset of the set of data vectors;

(e) performing (b) and (c) on the subset of the set of data vectors; wherein performing subspace segmentation comprises using GPCA;

wherein the implicit vector space comprises the Veronese Map; and wherein the tangent vector analysis comprises the Legendre Transform; and after (a) through (e) have been performed, the method further comprising:

(f) decomposing the re-sampled pel data into an encoded representation, the encoded representation representing a fourth intermediate form of the data; and (g) truncating zero or more bytes of the encoded representation; and (h) recomposing the re-sampled pel data from the encoded representation;

wherein each of the decomposing and recomposing uses Principal Component Analysis;

wherein generating correspondence models comprises using a robust estimator for the solution of a multi-dimensional projective motion model, and wherein analyzing the corresponding elements comprises using a sampling population based on finite differences generated from a block-based motion estimation between two or more of the video frames.

7. The method of claim 1 comprising a method of factoring the correspondence models into local deformation models, the method comprising:

defining a two dimensional mesh overlying pels corresponding to the at least one object, the mesh being based on a regular grid of vertices and edges, and;

generating a model of local motion from the relationships between the corresponding elements, the relationships comprising vertex displacements based on finite differences generated from a block-based motion estimation between two or more of the video frames.

8. The method of claim 7 wherein the vertices correspond to discrete image features, the method comprising identifying significant image features corresponding to the object by using an analysis of the image intensity gradient.

9. The method of claim 3 comprising:

forwarding the fourth intermediate form of the data for factoring into a local deformation model;

defining a two dimensional mesh overlying pels corresponding to the at least one object, the mesh being based on a regular grid of vertices and edges, and;

generating a model of local motion from the relationships between the corresponding elements, the relationships comprising vertex displacements based on finite differences generated from a block-based motion estimation between two or more of the video frames; and wherein local motion model is based on residual motion not approximated by global motion model.

10. The method of claim 7 comprising:

forwarding the fourth intermediate form of the data for factoring into a local deformation model;

defining a two dimensional mesh overlying pels corresponding to the at least one object, the mesh being based on a regular grid of vertices and edges, and;

generating a model of local motion from the relationships between the corresponding elements, the relationships comprising vertex displacements based on finite differences generated from a block-based motion estimation between two or more of the video frames; and wherein local motion model is based on residual motion not approximated by global motion model.

* * * * *